US009754172B2

(12) United States Patent
Hayakawa et al.

(10) Patent No.: US 9,754,172 B2
(45) Date of Patent: Sep. 5, 2017

(54) THREE-DIMENISIONAL OBJECT DETECTION DEVICE

(71) Applicant: Nissan Motor Co., Ltd., Yokohama-shi, Kanagawa (JP)

(72) Inventors: Yasuhisa Hayakawa, Yokohama (JP); Osamu Fukata, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 602 days.

(21) Appl. No.: 14/373,068

(22) PCT Filed: Feb. 26, 2013

(86) PCT No.: PCT/JP2013/054865
§ 371 (c)(1),
(2) Date: Jul. 18, 2014

(87) PCT Pub. No.: WO2013/129361
PCT Pub. Date: Sep. 6, 2013

(65) Prior Publication Data
US 2015/0002672 A1 Jan. 1, 2015

(30) Foreign Application Priority Data

Mar. 2, 2012 (JP) .................................. 2012-046670
Jul. 19, 2012 (JP) .................................. 2012-160775

(51) Int. Cl.
G06K 9/00 (2006.01)
G08G 1/095 (2006.01)
(Continued)

(52) U.S. Cl.
CPC ............ G06K 9/00805 (2013.01); B60R 1/00 (2013.01); G06K 9/00791 (2013.01);
(Continued)

(58) Field of Classification Search
CPC .................................................. G06K 9/00805
See application file for complete search history.

(56) References Cited

U.S. PATENT DOCUMENTS

2007/0285217 A1   12/2007   Ishikawa et al.

FOREIGN PATENT DOCUMENTS

EP    1826648 A2    8/2007
JP    2003-189294 A    7/2003
(Continued)

OTHER PUBLICATIONS

Chin-Teng Lin et al, "Construction of Fisheye Lens Inverse Perspective Mapping Model and Its Applications of Obstacle Detection," EURASIP Journal on Advances in Signal Processing, Jun. 15, 2010, vol. 1, No. 3, 2010, Hindawi Publishing Corporation, New York, NY.

Primary Examiner — James Pontius
(74) Attorney, Agent, or Firm — Global IP Counselors, LLP

(57) ABSTRACT

A three-dimensional object detection device includes an image capturing unit, a detection area setting unit, an image conversion unit, a three-dimensional object detection unit, a reference image area setting unit, a contour information extraction unit, a reference sharpness calculation unit and a subject sharpness calculation unit. The image conversion unit converts a viewpoint of an image obtained by the image capturing unit to create a bird's-eye view image. The reference image area unit sets a reference image area for extracting contour information by the contour information extraction unit. The reference sharpness calculation unit calculates a reference sharpness using contour information of the reference image area. The subject sharpness calculation unit calculates a subject sharpness using contour information of the detection area. The three-dimensional object detection unit calculates a final sharpness based on the reference
(Continued)

sharpness and the subject sharpness, and sets a difference threshold value based on the final sharpness.

20 Claims, 28 Drawing Sheets

(51) Int. Cl.
    *G06T 7/00*           (2017.01)
    *B60R 1/00*           (2006.01)
    *G08G 1/16*           (2006.01)

(52) U.S. Cl.
    CPC ........... *G06T 7/0002* (2013.01); *G08G 1/095* (2013.01); *G08G 1/166* (2013.01); *G08G 1/167* (2013.01); *G06T 2200/04* (2013.01); *G06T 2207/20116* (2013.01); *G06T 2207/30168* (2013.01); *G06T 2207/30252* (2013.01); *G06T 2207/30261* (2013.01)

(56) References Cited

FOREIGN PATENT DOCUMENTS

| | | |
|---|---|---|
| JP | 2008-219063 A | 9/2008 |
| JP | 2008-227646 A | 9/2008 |
| JP | 2010-223685 A | 10/2010 |
| JP | 2012-3662 A | 1/2012 |
| WO | 2009/057410 A1 | 5/2009 |
| WO | 2012/023412 A1 | 2/2012 |

THREE-DIMENISIONAL OBJECT DETECTION DEVICE

CROSS-REFERENCE TO RELATED APPLICATIONS

This application is a U.S. National stage application of International Application No. PCT/JP2013/054865, filed Feb. 26, 2013, which claims priority to Japanese Patent Application No. 2012-046670 filed in Japan on Mar. 2, 2012 and Japanese Patent Application No. 2012-160775 filed on Jul. 19, 2012. The entire disclosures of these Japanese Patent Applications are hereby incorporated herein by reference.

BACKGROUND

Field of the Invention

The present invention relates to a three-dimensional object detection device.

Background Information

In a conventionally known technique, a three-dimensional object is detected from captured images captured by a camera (see Japanese Laid-Open Patent Application No. 2008-227646).

SUMMARY

However, conventionally a clear captured image cannot be captured when the camera lens is soiled overall, and as a result, there are cases in which another vehicle cannot be detected from the captured image.

The problem to be solved by the present invention is to provide a three-dimensional object detection device capable of accurately detecting a three-dimensional object, even when the camera lens is soiled overall.

The present invention solves the problem by generating a difference waveform from the difference between two bird's-eye view images obtained at different times, detecting a three-dimensional object based on the difference waveform, and in doing so, setting an image area to be a reference image area in which detection of a fixed quantity of contour information is predicted, calculating the amount of clearness of the image in the reference image area as a reference sharpness, calculating the amount of clearness of the image in the detection area as a subject sharpness, and modifying a difference threshold value for detecting differences between the two bird's-eye view images based on comparison results between the reference sharpness and the subject sharpness.

In accordance with the present invention, a difference threshold value is modified in accordance with the clearness of an image, whereby detection sensitivity of differences between bird's-eye view images can be adjusted in accordance with the clearness of the image. Therefore, a three-dimensional object can be suitably detected even when the lens is soiled overall and the image is not clear.

BRIEF DESCRIPTION OF THE DRAWINGS

Referring now to the attached drawings which form a part of this original disclosure.

DETAILED DESCRIPTION OF THE EMBODIMENTS

Figure 1:
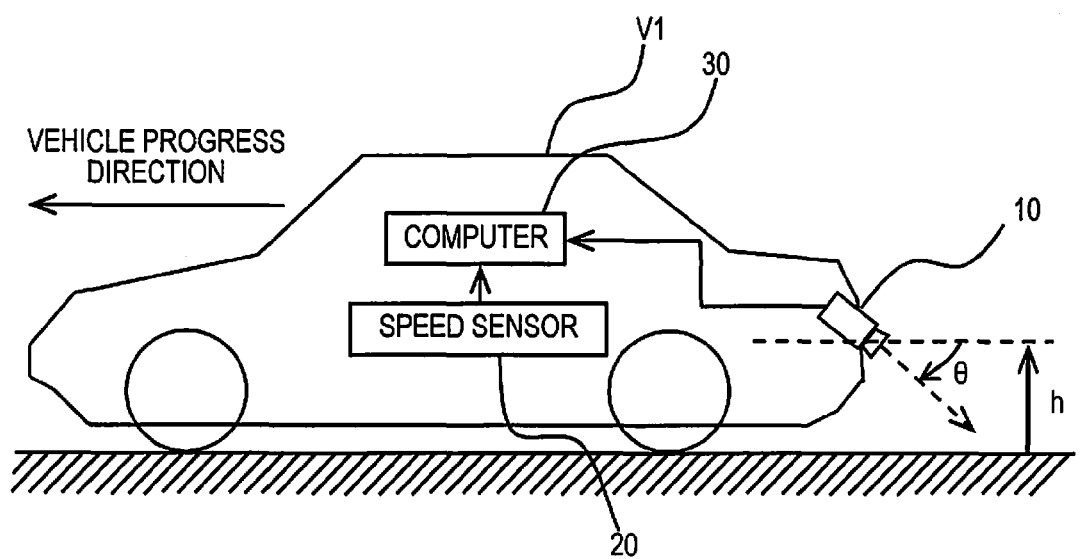
FIG. 1 is a schematic structural diagram of a vehicle in which a three-dimensional object detection device according to the first embodiment has been mounted.

FIG. 1 is a schematic overview of a vehicle in which a three-dimensional object detection device 1 according to the first embodiment has been mounted. An object of the three-dimensional object detection device 1 according to the present embodiment is to detect another vehicle (may hereinbelow be referred to as "adjacent vehicle") present in an adjacent lane where contact is possible should a host vehicle V1 change lanes. The three-dimensional object detection device 1 according to the present embodiment is provided with a camera 10, a speed sensor 20, and a computer 30, as illustrated in FIG. 1.

The camera 10 is attached to the host vehicle V1 so that the optical axis is an angle θ downward from the horizontal in a location at a height h at the rear of the host vehicle V1, as illustrated in FIG. 1. From this position, the camera 10 captures a predetermined area of the surrounding environment of the host vehicle V1. The speed sensor 20 detects the travel speed of the host vehicle V1 and calculates the vehicle speed from a wheel speed detected by, e.g., a wheel speed sensor for detecting the rotational speed of a wheel. The computer 30 detects an adjacent vehicle present in an adjacent lane rearward of the host vehicle.

Figure 2:
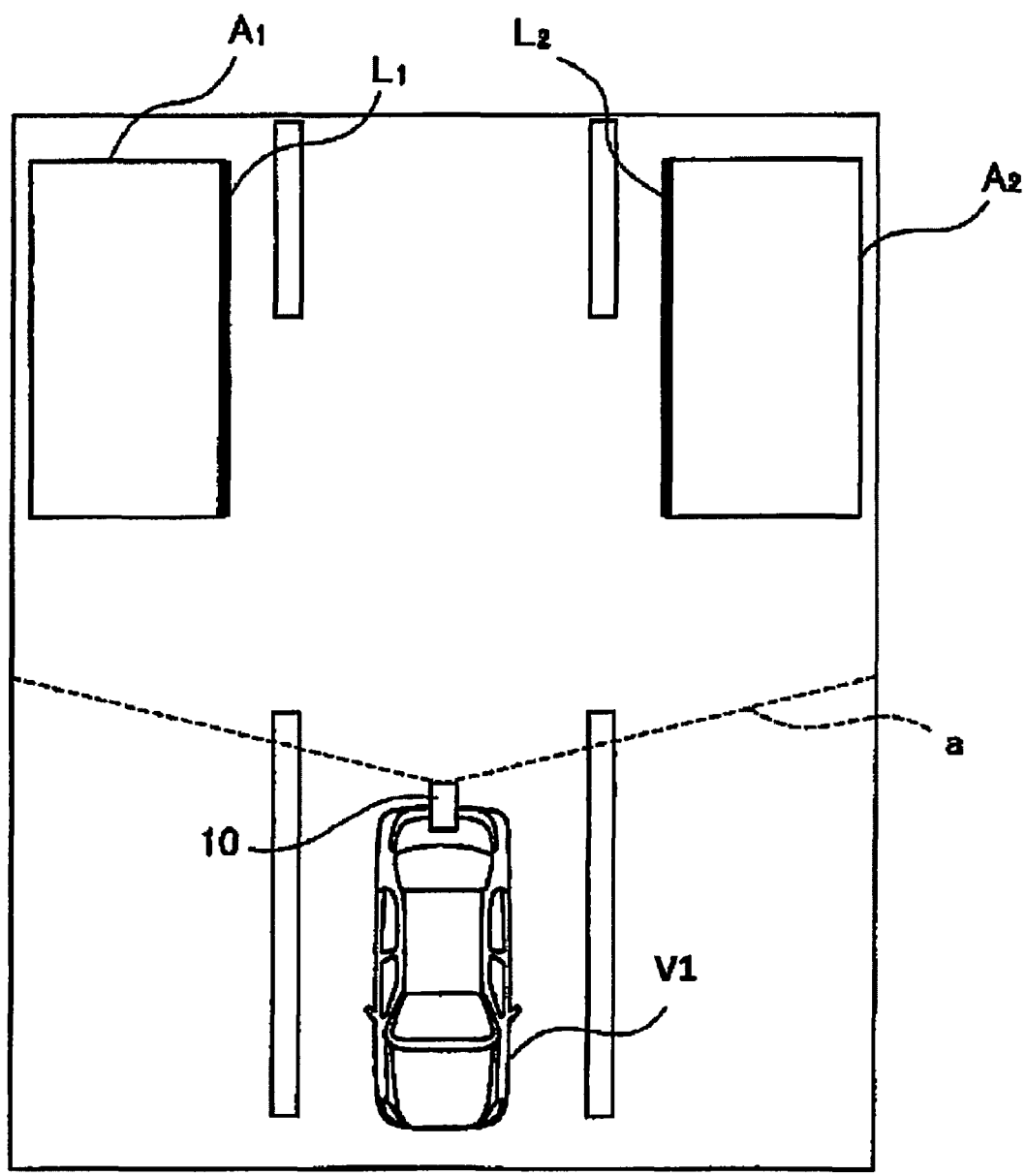
FIG. 2 is a plan view illustrating the traveling state of the vehicle in FIG. 1.

FIG. 2 is a plan view illustrating the traveling state of the host vehicle V1 in FIG. 1. As illustrated in the drawing, the camera 10 captures the rearward side of the vehicle at a predetermined view angle a. At this time, the view angle a of the camera 10 is set to a view angle that allows the left and right lanes (adjacent lanes) to be captured in addition to the lane in which the host vehicle V1 is traveling.

Figure 3:
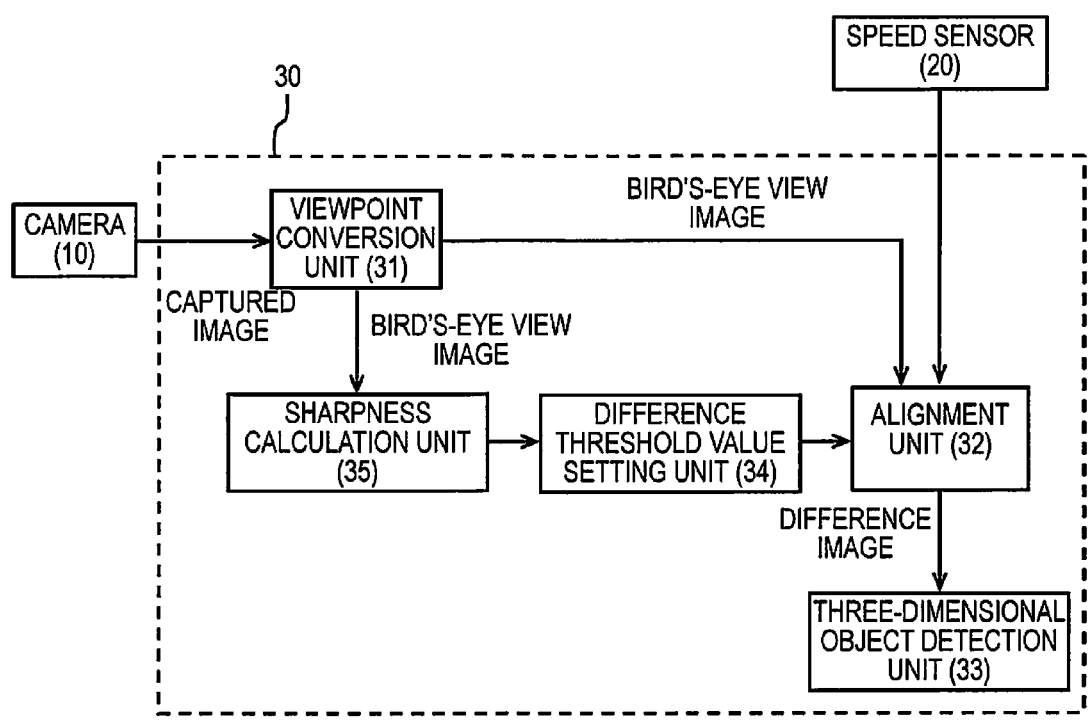
FIG. 3 is a block diagram illustrating the details of the computer according to the first embodiment.

FIG. 3 is a block view illustrating the details of the computer 30 in FIG. 1. The camera 10 and the speed sensor 20 are also illustrated in FIG. 3 in order to distinctly indicate connection relationships.

As illustrated in FIG. 3, the computer 30 is provided with a viewpoint conversion unit 31, an alignment unit 32, a three-dimensional object detection unit 33, difference threshold value setting unit 34, and a sharpness calculation unit 35. The configuration of these units is described below.

Captured image data of the predetermined area obtained by capturing carried out by the camera 10 is inputted to the viewpoint conversion unit 31, and the captured image data thus inputted is converted to bird's-eye view image data, which is a bird's-eye view state. A bird's-eye view state is a state of viewing from a viewpoint of an imaginary camera that is looking down from above, e.g., vertically downward. Viewpoint conversion can be carried out in the manner described in, e.g., Japanese Laid-Open Patent Application No. 2008-219063. The reason that captured image data is converted to bird's-eye view image data is based on the principle that perpendicular edges unique to a three-dimensional object are converted to a straight-line group that passes through a specific fixed point by viewpoint conversion to bird's-eye view image data, and utilizing this principle allows a planar object and a three-dimensional object to be differentiated.

Figure 4:
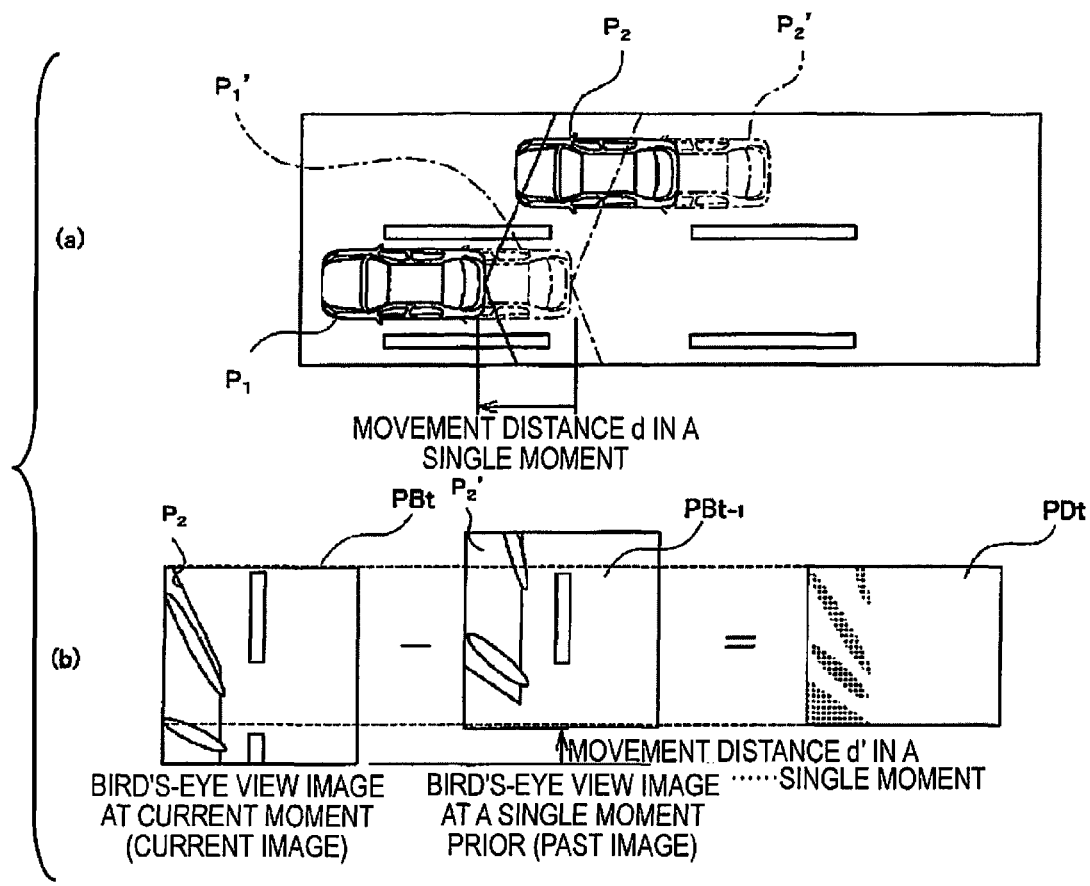
FIG. 4 is a view describing the general overview of the processing of the alignment unit according to the first embodiment, with part (a) illustrating the movement state of the vehicle from a top plan view, and part (b) illustrating a general overview of alignment.

The bird's-eye view image data obtained by viewpoint conversion carried out by the viewpoint conversion unit 31 is sequentially inputted to the alignment unit 32, and the inputted positions of the bird's-eye view image data at different times are aligned. FIG. 4 is a view for describing the general overview of the processing of the alignment unit 32, with part (a) of FIG. 4 being a plan view illustrating the movement state of the host vehicle V1, and part (b) of FIG. 4 being an image illustrating a general overview of alignment.

As illustrated in part (a) of FIG. 4, the host vehicle V1 at the current moment is positioned at $P_1$, and the host vehicle V1 at a single moment prior is positioned at $P_1'$. It is assumed that an adjacent vehicle V2 is positioned in the rear-side direction of the host vehicle V1 and is travelling parallel to the host vehicle V1, and that the adjacent vehicle V2 at the current moment is positioned at $P_2$, and the adjacent vehicle V2 at a single moment prior is positioned at $P_2'$. Also, it is assumed that the host vehicle V1 has moved a distance d in a single moment. The phrase "at a single moment prior" may be a moment in the past by a time set in advance (e.g., a single control cycle) from the current moment, or may be a moment in the past by an arbitrary time.

In such a state, a bird's-eye view image $PB_t$ at the current moment is illustrated in part (b) of FIG. 4. The white lines drawn on the road surface are rectangular in this bird's-eye view image $PB_1$ and are relatively accurate in a planar view, but the adjacent vehicle V2 (position $P_2$) is collapsed. The same applies to the bird's-eye view image $PB_{t-1}$ at a single moment prior; the white lines drawn on the road surface are rectangular and are relatively accurate in a planar view, but the adjacent vehicle V2 (position $P_2'$) is collapsed. As previously described, perpendicular edges of a three-dimensional object (edges that stand erect in three-dimensional space from the road surface are also included in a strict meaning of perpendicular edge) appear as a straight-line group along a collapsing direction due to the process for converting the viewpoint to bird's-eye view image data, but because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this is carried out, the alignment unit 32 offsets the bird's-eye view image $PB_{t-1}$ at a single moment prior, and matches the position with the bird's-eye view image $PB_t$ at the current moment. The left-side image and the center image in part (b) of FIG. 4 illustrate the offset state by a movement distance d'. The offset amount d' is the amount of movement in the bird's-eye view image data that corresponds to the actual movement distance d of the host vehicle V1 illustrated in part (a) of FIG. 4, and is decided based on a signal from the speed sensor 20 and the time from a single moment prior to the current moment.

After alignment, the alignment unit 32 obtains the difference between the bird's-eye view images $PB_t$ and $PB_{t-1}$, and generates difference image $PD_t$ data. In the present embodiment, the alignment unit 32 takes the absolute value of the difference in the pixel values of the bird's-eye view images $PB_t$ and $PB_{t-1}$ in order correspond to variation in the illumination environment, and when the absolute value is equal to or greater than a predetermined threshold value th, the pixel values of the difference image $PD_t$ are set to "1," and when the absolute value is less than a predetermined threshold value th, the pixel values of the difference image $PD_t$ are set to "0," which allows difference image $PD_t$ data such as that illustrated on the right side of part (b) of FIG. 4 to be generated.

In the present embodiment, the difference threshold value th described above is set by the difference threshold value setting unit 34 shown in FIG. 3. In the present embodiment, the difference threshold value setting unit 34 sets the difference threshold value th based on the calculation results of the later-described sharpness calculation unit 35. Described below is the method for setting the difference threshold value th carried out by the difference threshold value setting unit 34 and the sharpness calculation unit 35.

The sharpness calculation unit 35 calculates the amount of clearness of the bird's-eye view image as the sharpness. In other words, the sharpness calculation unit 35 calculates the sharpness to be higher in commensurate fashion to the extent that a subject is clearly displayed in the bird's-eye view image, and on the other hand, calculates the sharpness to be lower in commensurate fashion to the extent the subject not clearly displayed. For example, when the lens of the camera 10 is soiled overall (e.g., the lens surface dries after the lens has been wetted by rain, and marks from raindrops are left on the lens in the form of a white film), the sharpness is calculated to be low.

In the present embodiment, the sharpness calculation unit 35 calculates two types of sharpness, namely, a reference sharpness and a subject sharpness. As used herein, the reference sharpness refers to the sharpness in an image area in which a predetermined subject is predicted to be present, and the subject sharpness refers to the sharpness in the detection areas A1, A2. The method for calculating the reference sharpness and the subject sharpness carried out by the sharpness calculation unit 35 is described below. The method for calculating the sharpness described below is an example, and no limitation is imposed thereby.

Figure 5:
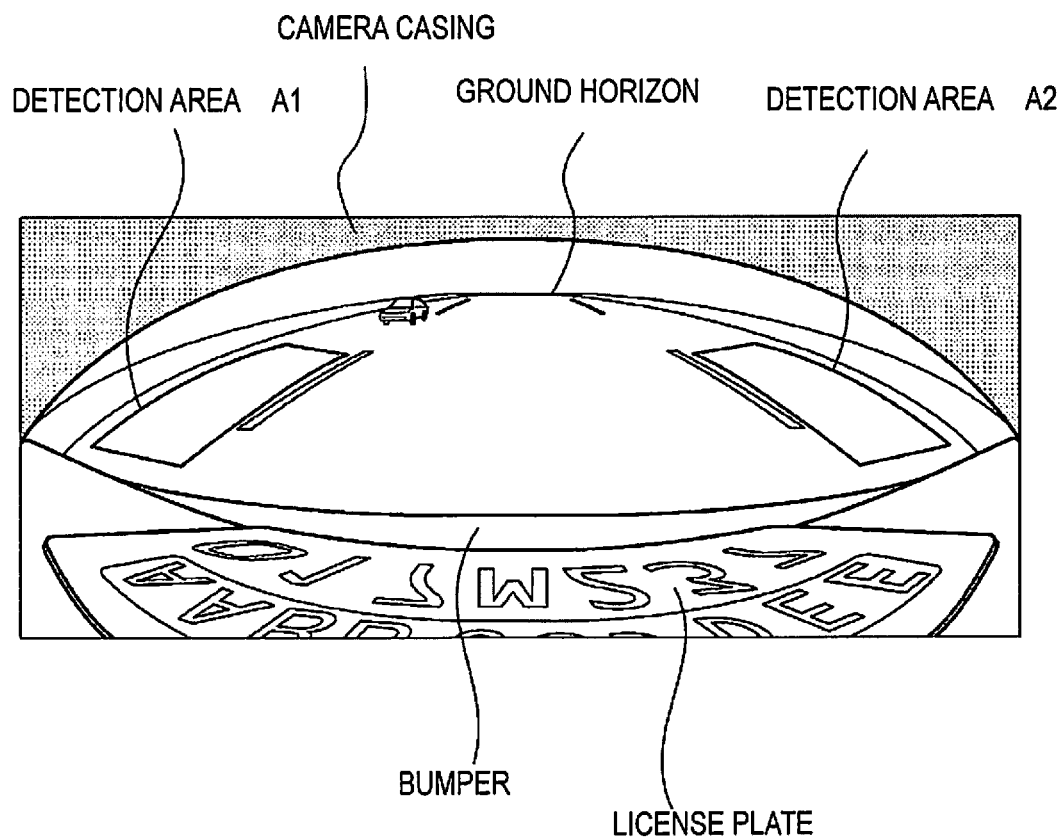
FIG. 5 is a view illustrating an example of an image captured by the camera.

Described first is the method for calculating the reference sharpness. In the present embodiment, the sharpness calculation unit 35 first sets as the reference image area the image area in which it can be predicted that a fixed quantity of edges or more will be detected in the bird's-eye view image. For example, the bumper of the host vehicle, the casing of the camera 10 for attaching the camera 10 to the host vehicle, the license plate of the host vehicle, and the like are captured in a specific image area depending on the installation position, installation angle, and the like of the camera 10, as shown in FIG. 5. Such a subject is a portion of the host vehicle and is present in a position near the camera 10 mounted in the host vehicle. Accordingly, when such a subject has been captured, the subject is captured with relative clarity, and it can be predicted that a fixed quantity of edges or more can be extracted from the captured subject. In view of the above, the sharpness calculation unit 35 sets an image area that corresponds to an image of the bumper of the host vehicle, the casing of the camera 10, license plate of the host vehicle, or another portion of the host vehicle as the reference image area in which extraction of a fixed quantity of edges is predicted. Such an image of a portion of the host vehicle is positioned in a specific area, as illustrated in FIG. 5, and a reference image area can be set without detection of the position of a subject.

The method for setting the reference image area is not limited to the method described above, and the reference image area may also be set in the following manner. For example, an image area that includes a water horizon may be set as the reference image area. Contrast is readily produced between sky and ocean in an image area containing a water horizon because it is predicted that a fixed quantity of edges or more can be extracted. Also, an image area containing a ground horizon may be set as the reference image area, as illustrated in FIG. 5. Contrast is readily produced between sky and roadway in an image area containing a ground horizon because it is predicted that a fixed quantity of edges or more can be extracted. An image area that corresponds to distant scenery such as a water horizon and a ground horizon is positioned in a specific area, and it is therefore possible to set a reference image area without detecting the position of a subject, as illustrated in FIG. 5. It is also possible to use a configuration in which an image area containing a water horizon is set as the reference image area during daytime, and an image area containing a ground horizon is set as the reference image area during nighttime.

It is furthermore possible to use a configuration in which the sharpness calculation unit 35 sets an image area containing a vanishing point of the roadway as the reference image area. This is due to the fact that the relative movement speed of a subject in an image is reduced in an image area containing a vanishing point of the roadway, and the edges of the subject can therefore be stably detected. Accordingly, setting the image area near a vanishing point including, e.g., a ground horizon, as the reference image area allows the sharpness calculation unit 35 to more appropriately extract a fixed quantity of edges or more.

Additionally, the sharpness calculation unit 35 may set an image area containing an image street lights, the headlights of another vehicle, or another light source as the reference image area. This is due to the fact that contrast is readily produced between high-luminance areas such as street lights and headlights and low-luminance areas in the vicinity thereof, and it is predicted that a fixed quantity of edges or more can be extracted. The method for detecting street lights, headlights, and other light sources is not particularly limited, and the sharpness calculation unit 35 may, e.g., detect, as the area corresponding to the light source, an image area having predetermined size or greater and in which the difference in brightness with the surroundings is at a predetermined value or higher.

The sharpness calculation unit 35 calculates the amount of clarity in the image in the reference image area as the reference sharpness. Specifically, when a luminance difference between mutually adjacent pixels is at a predetermined value or higher in the reference image area, the sharpness calculation unit 35 assesses that an edge (contour) of a subject is present between these mutually adjacent pixels, and extracts the edge of the subject from pixels having such a luminance difference. The sharpness calculation unit 35 calculates the reference sharpness in the reference image area to be a higher value in commensurate fashion to a higher intensity of the edge extracted in the reference image area.

Figure 6:
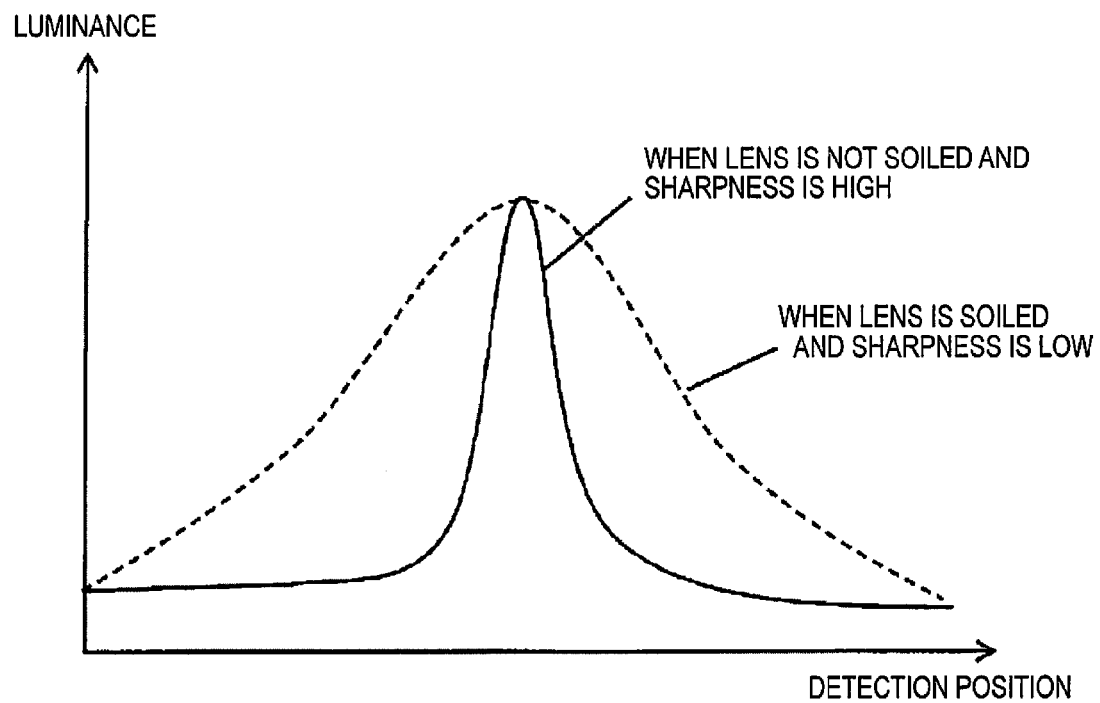
FIG. 6 is a view for describing the relationship between lens soiling and sharpness.

Here, FIG. 6 is a view for describing the relationship between lens soiling and sharpness (image clarity). In FIG.

6, the vertical axis indicates luminance and the horizontal axis indicates the position of pixels. Also, a situation in which a street light, headlights, or other subject having high luminance is captured is given as an example in FIG. 6. When the lens of the camera 10 is soiled, light incident on the lens from the subject is irregularly reflected by the soil deposited on the lens of the camera 10, the slope of the luminance peak becomes gradual in comparison with when the lens is not soiled, and the luminance difference between pixels is reduced, as illustrated in FIG. 6. Accordingly, the sharpness calculation unit 35 detects the edge intensity to be low when the lens of the camera 10 soiled, and in such a case, calculates the reference sharpness to be a low value. On the other hand, when the lens is not soiled, the slope of the luminance peak is steep, and the luminance difference between pixels is considerable, as illustrated in FIG. 6. Accordingly, the sharpness calculation unit 35 detects the edge intensity to be high when the lens of the camera 10 is not soiled, and in such a case, calculates the reference sharpness to be a high value. In this manner, the sharpness calculation unit 35 calculates the reference sharpness indicating the amount of image clarity in accordance with the edge intensity.

The method for calculating the reference sharpness by the sharpness calculation unit 35 is not limited to the method described above, and the reference sharpness may be calculated using the following method. In other words, an area having a luminance at a predetermined value or higher may be detected as a high-luminance area and the reference sharpness may be calculated based on the slope of the luminance in vicinity of the detected high-luminance area. Specifically, the sharpness calculation unit 35 detects the slope of the luminance directed outward from the outer edge of the high-luminance area that corresponds to a street light, headlights, or another light source when the image area containing an image of street lights, headlights, or another light source has been set as the reference image area. In this case, when the lens is not soiled, as illustrated in FIG. 6, the slope of the luminance is steep, and conversely, when the lens is soiled, the slope of the luminance is gradual. Accordingly, the sharpness calculation unit 35 detects a steep slope of the luminance when the lens of the camera 10 is not soiled, and in this case, calculates the reference sharpness to be a high value. On the other hand, when the lens of the camera 10 is soiled, the sharpness calculation unit 35 detects a gradual slope of the luminance, in this case, calculates the reference sharpness to be a low value.

It is also possible to use a configuration in which the reference sharpness is calculated based on a frequency component of the image. In other words, a frequency component of the subject is extracted from the image signal obtained in the reference image area, and a high-frequency component is removed by processing the extracted frequency component through a low-pass filter. A comparison is made of the frequency component with the high-frequency component removed and the frequency component prior to the high-frequency component being removed, and the high-frequency component of the subject is extracted to thereby calculate the extracted high-frequency component as the reference sharpness. The high-frequency component of the subject obtained from the reference image area is obtained from a high contrast area of the reference image area, and a clearer image (higher contrast) is obtained in commensurate fashion to a greater number of the high-frequency components, and in such a case, the reference sharpness is calculated to be a high value.

Figure 7:
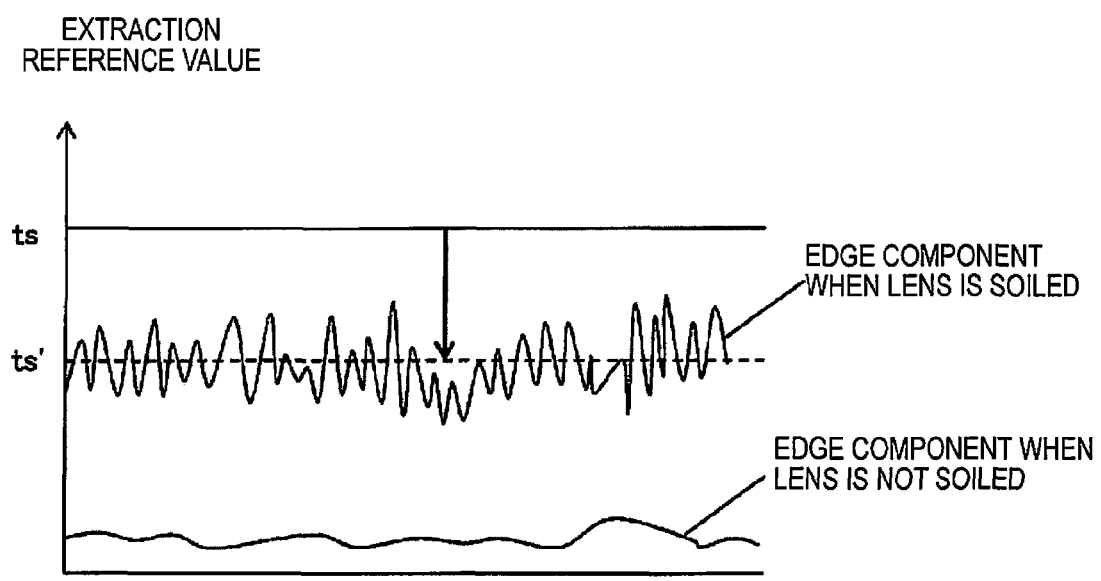
FIG. 7 is a view for describing the method for calculating the reference sharpness based on an extraction reference value.

It is also possible to use a configuration in which the reference sharpness is calculates based on an extraction reference value used when edges are extracted from the reference image area. Here, FIG. 7 is a view for describing the method for calculating the reference sharpness based on an extraction reference value. For example, in the example illustrated in FIG. 7, the sharpness calculation unit 35 extracts edges having an extraction reference value is or greater set in advance from the reference image area, and assesses whether a predetermined quantity of edges or greater has been extracted. When predetermined quantity of edges or greater could not be extracted, the sharpness calculation unit 35 modifies the extraction reference value ts to a lower value, extracts edges having the modified extraction reference value or greater, and assesses whether a predetermined quantity of edges or greater could be extracted in the reference image area. In this manner, the sharpness calculation unit 35 repeatedly extracts edges while modifying the extraction reference value to a lower value, and specifies an extraction reference value ts' at which a predetermined quantity of edges or greater can be extracted (the largest extraction reference value ts' among extraction reference values in which a predetermined quantity of edges or greater can be extracted). In this case, when the same subject has been captured, the contour of the subject blurs, and the intensity of the extracted edges of the subject is reduced in commensurate fashion to the lack of clarity of the image due to soiling of the lens, as illustrated in FIG. 7. Accordingly, when the lens is soiled and there is a lack of clarity of the image, a predetermined quantity of edges or greater cannot be extracted unless the extraction reference value is modified to a lower value in comparison with when the lens is not soiled and the image is clearly displayed, as illustrated in FIG. 7. In view of the above, the sharpness calculation unit 35 determines the lens to be soiled and the image to lack clarity in commensurate fashion to a lower extraction reference value at which a predetermined quantity of edges or greater could be extracted, and calculates the reference sharpness to be a lower value.

In addition to the reference sharpness that corresponds to the reference image area, the sharpness calculation unit 35 furthermore calculates the amount of clarity of the image in the detection areas A1, A2 as the subject sharpness. Excluding that the sharpness is calculated in the detection areas A1, A2, the method for calculating the subject sharpness is the same as the method for calculating the reference sharpness, and a description thereof is therefore omitted.

Figure 8:
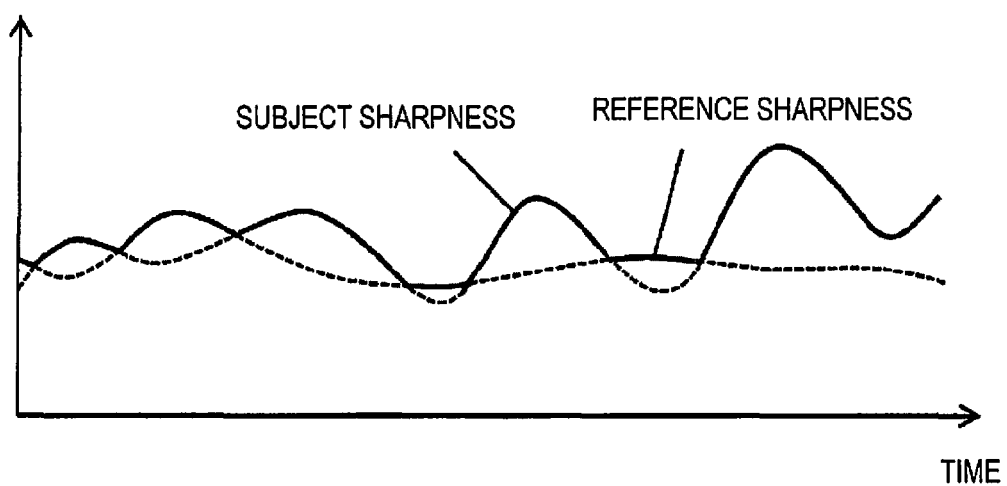
FIG. 8 is a view for describing the method for comparing the reference sharpness and the subject sharpness, and calculating the final sharpness.

The sharpness calculation unit 35 then compares the calculated reference sharpness and subject sharpness, and calculates the higher value of the reference sharpness and the subject sharpness as the final sharpness, as illustrated in FIG. 8. FIG. 8 is a graph illustrating an example of the final sharpness, and in FIG. 8, the final sharpness is represented by as a solid line. Also in FIG. 8, the horizontal axis indicates time and the vertical axis indicates the sharpness value.

Figure 9:
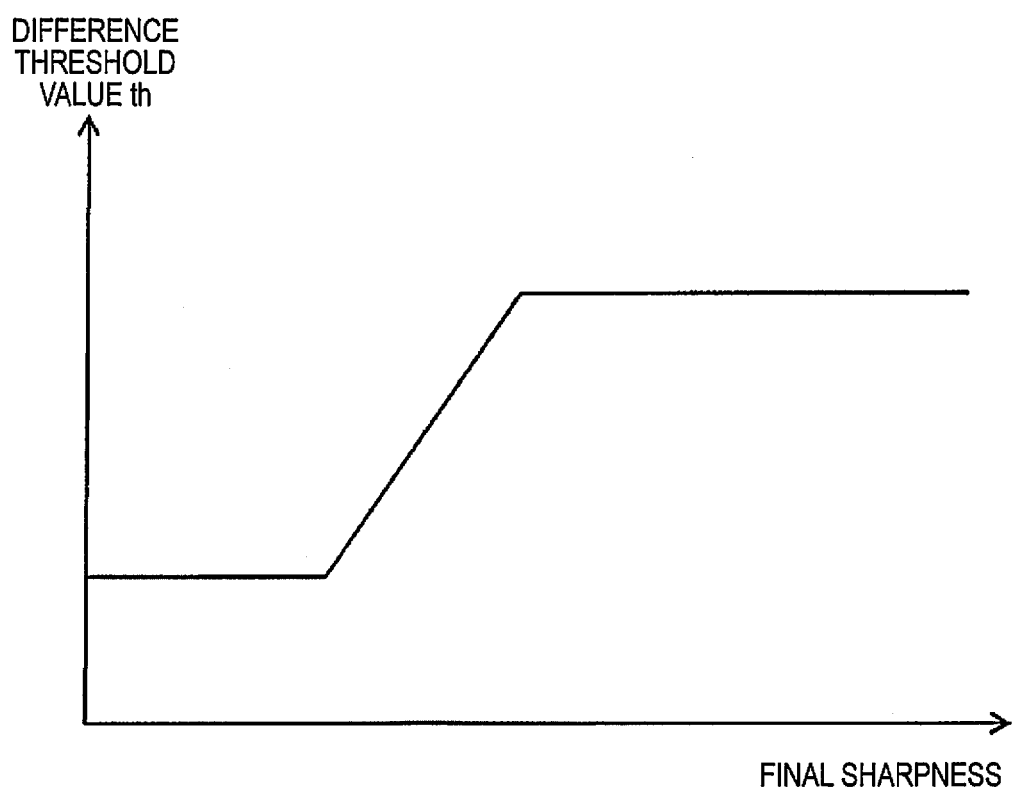
FIG. 9 is a graph for illustrating an example of the relationship between the final sharpness and the difference threshold value th.

Returning to FIG. 3, the difference threshold value setting unit 34 calculates the difference threshold value th based on the final sharpness calculated by the sharpness calculation unit 35. Here, FIG. 9 is a graph for illustrating the relationship between the final sharpness and the difference threshold value th. The difference threshold value setting unit 34 sets the difference threshold value th to be lower in commensurate fashion to a lower final sharpness, and sets the difference threshold value th to be a higher value in commensurate fashion to a higher final sharpness, as illustrated in FIG. 9.

The difference threshold value th is thereby set to be low when the lens of the camera 10 is soiled overall and the final sharpness is low.

The differences between the two bird's-eye view image obtained at different times are locations in which changes have occurred in the two bird's-eye view image obtained at different times, i.e., locations in which it can be construed that there is a high possibility that a three-dimensional object is present. Accordingly, reducing the difference threshold value th when the final sharpness of the detection areas is low to enhance the sensitivity for detecting the difference between the two bird's-eye view image obtained as different times allows a three-dimensional object in the detection areas to be readily detected. As a result, a three-dimensional object can be suitably detected in the detection areas even when the lens is soiled overall and the final sharpness of the detection areas is low.

Returning to FIG. 3, the three-dimensional object detection unit 33 detects a three-dimensional object based on the difference image $PD_t$ data illustrated in part (b) of FIG. 4. In this case, the three-dimensional object detection unit 33 calculates the movement distance of the three-dimensional object in actual space. The three-dimensional object detection unit 33 first generates a first difference waveform when the three-dimensional object is detected and the movement distance is to be calculated.

Specifically, the three-dimensional object detection unit 33 generates a difference waveform in the detection areas set by the later-described difference threshold value setting unit 34. An object of the three-dimensional object detection device 1 of the present example is to calculate the movement distance for the adjacent vehicle with which there is a possibility of contact should the host vehicle V1 change lanes. Accordingly, in the present example, rectangular detection areas A1, A2 are set behind the host vehicle V1, as illustrated in FIG. 2. Such detection areas A1, A2 may be set from a relative position to the host vehicle V1, or may be set based on the position of the white lines. When set based on the position of the white lines, the three-dimensional object detection device 1 may use, e.g., known white line recognition techniques. The method for setting the detection areas carried out by the difference threshold value setting unit 34 is later described.

The three-dimensional object detection unit 33 recognizes as ground lines L1, L2 the borders of the detection areas A1, A2 thus set, on the host vehicle V1 side (side along the traveling direction), as illustrated in FIG. 2. Generally, a ground line refers to a line in which a three-dimensional object is in contact with the ground, but in the present embodiment, a ground line is not a line in contact with the ground, but is rather set in the manner described above. Even in such a case, the difference between the ground line according to the present embodiment and the normal ground line determined from the position of the adjacent vehicle V2 is not exceedingly great as determined by experience, and there is no problem in actuality.

Figure 10:
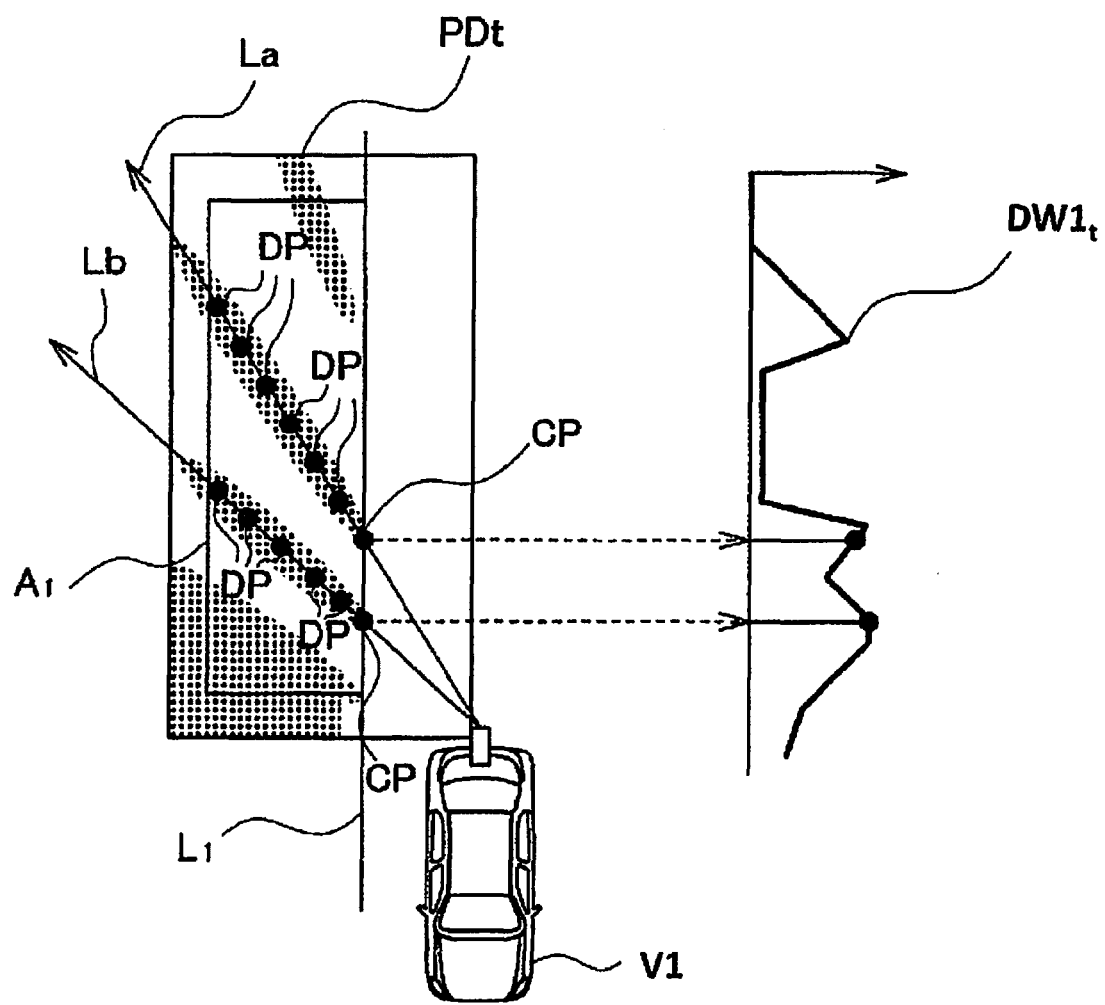
FIG. 10 is a schematic view illustrating the manner in which the difference waveform is generated by the three-dimensional object detection unit according to the first embodiment.

FIG. 10 is a schematic view illustrating the manner in which the difference waveform is generated by the three-dimensional object detection unit 33. As illustrated in FIG. 10, the three-dimensional object detection unit 33 generates a difference waveform $DW_t$ from the portion that corresponds to the detection areas A1, A2 in the difference image $PD_t$ (drawing on the right in part (b) of FIG. 6) calculated by the alignment unit 32. In this case, the three-dimensional object detection unit 33 generates a difference waveform $DW_t$ along the collapsing direction of the three-dimensional object by viewpoint conversion. In the example illustrated in FIG. 10, only the detection area A1 will be described for the sake of convenience, but the difference waveform $DW_t$ is generated for the detection area A2 as well using the same procedure.

More specifically, first, the three-dimensional object detection unit 33 defines a line La in the direction in which the three-dimensional object collapses in the difference image $PD_t$ data. The three-dimensional object detection unit 33 then counts the number of difference pixels DP indicating a predetermined difference on the line La. In the present embodiment, the pixel value of pixels having a difference of the difference threshold value th or greater set by the difference threshold value setting unit 34 is expressed as "1," the pixel value of pixels having a difference of less than the difference threshold value th is expressed as "0," and the pixels indicating a pixel value of "1" are counted as difference pixels DP.

The three-dimensional object detection unit 33 counts the number of difference pixels DP, and thereafter determines the crossing point CP of the line La and the ground line L1. The three-dimensional object detection unit 33 then correlates the crossing point CP and the count number, decides horizontal-axis position, i.e., the position on the axis in the vertical direction in the drawing on the right in FIG. 10, based on the position of the crossing point CP, decides the vertical-axis position, i.e., the position on the axis in the lateral direction in the drawing on the right in FIG. 10, from the count number, and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generate a difference waveform $DW_t$ as illustrated in the drawing on the right in FIG. 10.

As described above, the difference pixels DP in the difference image $PD_t$ data are pixels which have changed in the image at different moments, in other words, locations that can be construed to be where a three-dimensional object was present. Accordingly, in locations where a three-dimensional object was present, the number of pixels is counted along the direction in which the three-dimensional object collapses to form a frequency distribution and thereby generate a difference waveform $DW_t$. In particular, the number of pixels is counted along the direction in which the three-dimensional object collapses, and a difference waveform $DW_t$ is therefore generated from information about the height direction in relation to the three-dimensional object.

The lines La and Lb in the direction in which the three-dimensional object collapses have different distances that overlap the detection area A1, as illustrated in the drawing on the left in FIG. 10. Accordingly, the number of difference pixels DP is greater on the line La than on the line Lb when it is assumed that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is decided from the count number of the difference pixels DP. In a specific example, there are six difference pixels DP on the line La and there are five difference pixels DP on the line Lb in the drawing on the left in FIG. 10. Accordingly, when the vertical-axis position is decided from the count number in FIG. 10, the three-dimensional object detection unit 33 divides the count number by the overlapping distance or performs normalization in another manner. The values of the difference waveform $DW_t$ that correspond to the lines La, Lb in the direction in which the three-dimensional object collapses are thereby made to be substantially the same.

After the difference waveform $DW_t$ has been generated, the three-dimensional object detection unit 33 calculates the movement distance by comparing the difference waveform $DW_t$ at the current moment and the difference waveform $DW_{t-1}$ at a single moment prior. In other words, the three-dimensional object detection unit 33 calculates the movement distance from the change in time of the difference waveform $DW_t$ and the difference waveform $DW_{t-1}$.

Figure 11:
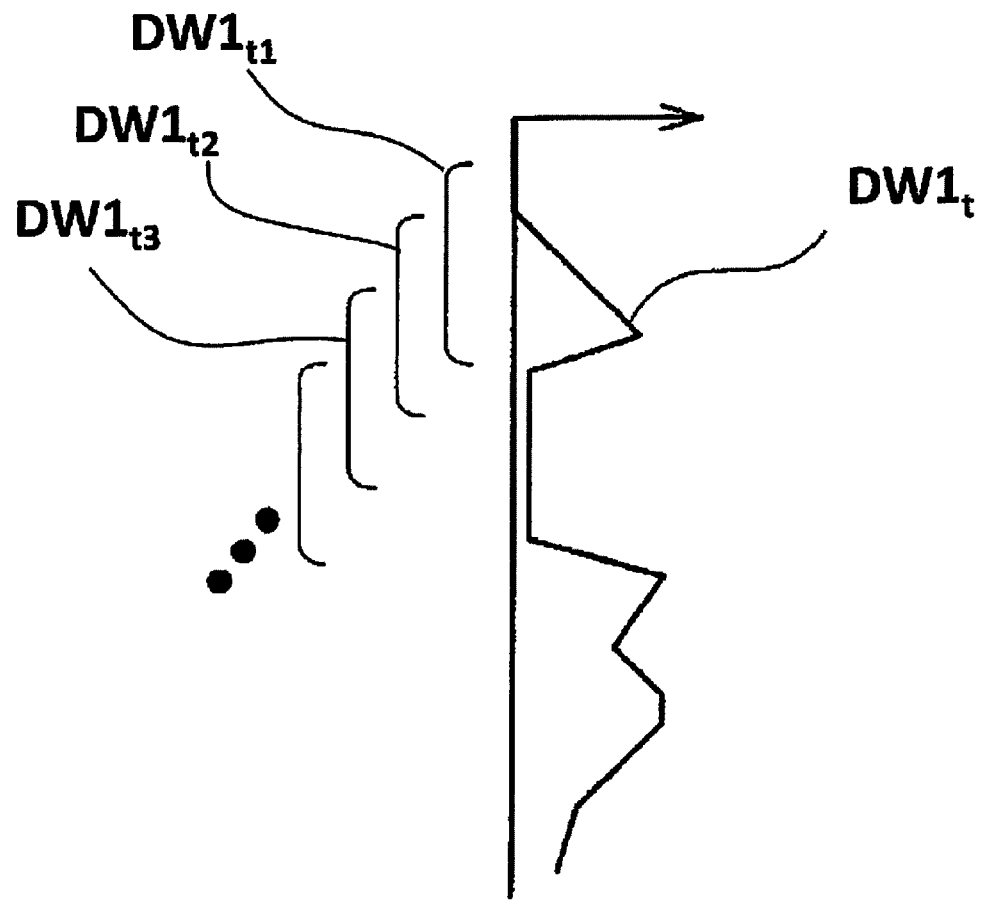
FIG. 11 is a view describing the small areas divided by the three-dimensional object detection unit according to the first embodiment.

More specifically, the three-dimensional object detection unit 33 divides the difference waveform $DW_t$ into a plurality of small areas $DW_{t1}$ to $DW_{tn}$ (where n is an arbitrary integer of 2 or greater), as illustrated in FIG. 11. FIG. 11 is a view illustrating the small areas $DW_{t1}$ to $DW_{tn}$ divided by the three-dimensional object detection unit 33. The small areas $DW_{t1}$ to $DW_{tn}$ are divided so as to be mutually overlapping, as illustrated in, e.g., FIG. 11. For example, the small area $DW_{t1}$ and the small area $DW_{t2}$ overlap each other, and the small area $DW_{t2}$ and the small area $DW_{t3}$ overlap each other.

Next, the three-dimensional object detection unit 33 determines the offset amount (the amount of movement in the horizontal-axis direction (vertical direction in FIG. 11) of the difference waveform) for each of the small areas $DW_{t1}$ to $DW_{tn}$. Here, the offset amount is determined from the difference (distance in the horizontal-axis direction) between the difference waveform $DW_{t-1}$ at a single moment prior and the difference waveform $DW_t$ at the current moment. In this case, the three-dimensional object detection unit 33 moves the difference waveform $DW_{t-1}$ at a single moment prior in the horizontal-axis direction for each of the small areas $DW_{t1}$ to $DW_{tn}$, and thereupon assesses the position (the position in the horizontal-axis direction) in which the error from the difference waveform $DW_t$ at the current moment is at a minimum, and determines as the offset amount the movement amount in the horizontal-axis direction at the position in which the error from the original position of the difference waveform $DW_{t-1}$ is at a minimum. The three-dimensional object detection unit 33 then counts the offset amount determined for each of the small areas $DW_{t1}$ to $DW_{tn}$ and forms a histogram.

Figure 12:
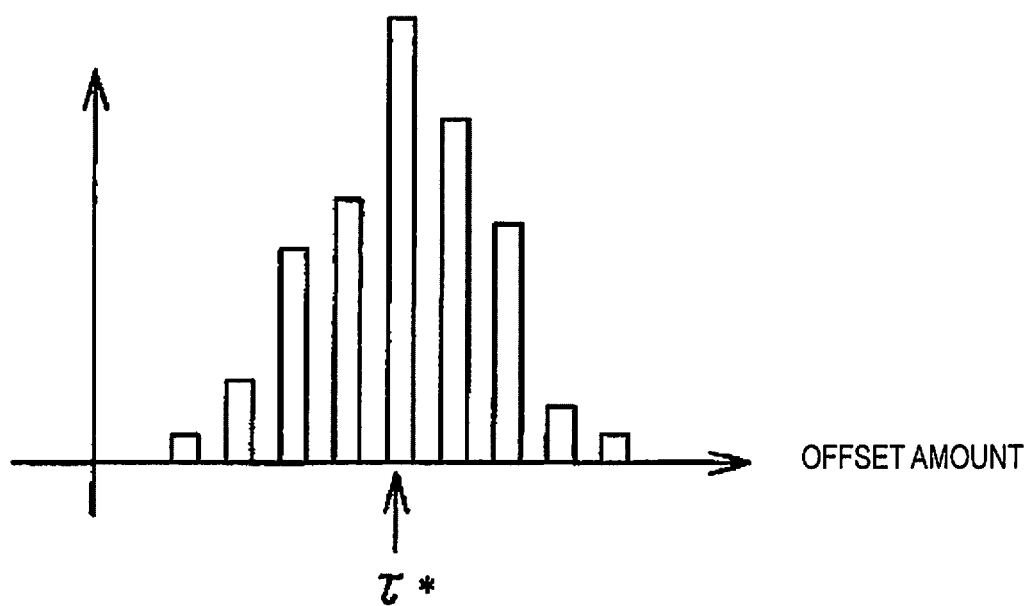
FIG. 12 is a view illustrating an example of the histogram obtained by the three-dimensional object detection unit according to the first embodiment.

FIG. 12 is a view illustrating an example of the histogram obtained by the three-dimensional object detection unit 33. As illustrated in FIG. 12, some amount of variability occurs in the offset amount, which is the movement distance in which the error between the small areas $DW_{t1}$ to $DW_{tn}$ and the difference waveform $DW_{t-1}$ at a single moment prior is at a minimum. Accordingly, the three-dimensional object detection unit 33 forms the offset amounts including the variability into a histogram and calculates the movement distance from the histogram. At this point, the three-dimensional object detection unit 33 calculates the movement distance of the three-dimensional object from the maximum value in the histogram. In other words, in the example illustrated in FIG. 12, the three-dimensional object detection unit 33 calculates the offset amount indicating the maximum value of the histogram as the movement distance $\tau^*$. In this manner, in the present embodiment, a more highly accurate movement distance can be calculated from the maximum value, even when there is variability in the offset amount. The movement distance $\tau^*$ is the relative movement distance of the three-dimensional object in relation to the host vehicle. Accordingly, the three-dimensional object detection unit 33 calculates the absolute movement distance based on the movement distance $\tau^*$ thus obtained and the speed sensor 20 when the absolute movement distance is to be calculated.

In this manner, in the present embodiment, the movement distance of the three-dimensional object is calculated from the offset amount of the difference waveform $DW_t$ when the error in the difference waveform $DW_t$ generated at different moments is at a minimum, and this allows the movement distance to be calculated from the offset amount, which is information about one dimension in a waveform, and allows computation cost to be kept low when the movement distance is calculated. Also, dividing the difference waveform $DW_t$ generated at different moments into a plurality of small areas $DW_{t1}$ to $DW_{tn}$ allows a plurality of waveforms representing the locations of the three-dimensional object to be obtained, thereby allowing the offset amount at each location of the three-dimensional object to be determined and allowing the movement distance to be determined from a plurality of offset amounts. Therefore, precision of calculating the movement distance can be improved. In the present embodiment, the movement distance of the three-dimensional object is calculated from the change in time of the difference waveform $DW_t$, which includes height direction information. Consequently, in contrast to the focus being solely on the movement of a single point, the detection location prior to change in time and the detection location after change in time are specified with height direction information included and accordingly readily end up being the same location; the movement distance is calculated from the change in time at the same location; and the precision for calculating the movement distance can be improved.

Figure 13:
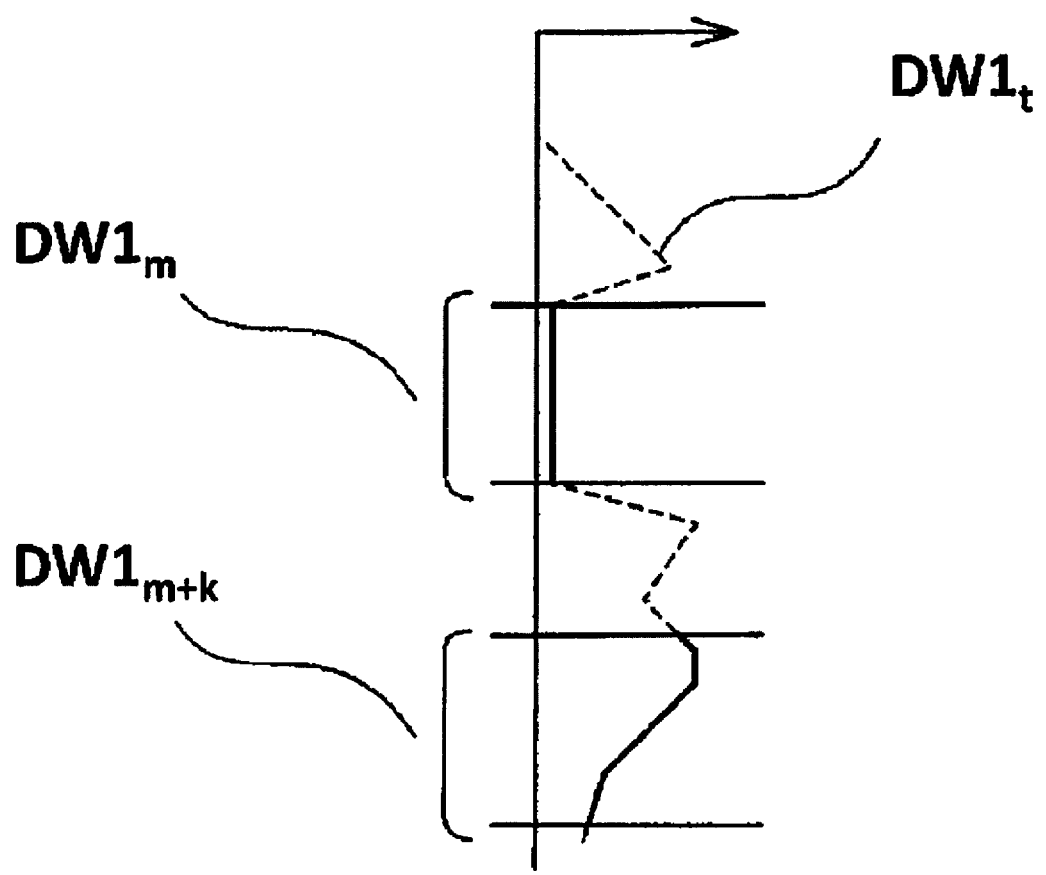
FIG. 13 is a view illustrating the weighting used by the three-dimensional object detection unit according to the first embodiment.

When a histogram is to be formed, the three-dimensional object detection unit 33 may impart a weighting to the plurality of small areas $DW_{t1}$ to $DW_{tn}$, and count the offset amounts determined for each of the small areas $DW_{t1}$ to $DW_{tn}$ in accordance with the weighting to form a histogram. FIG. 13 is a view illustrating the weighting used by the three-dimensional object detection unit 33.

As illustrated in FIG. 13, a small area $DW_m$ (where m is an integer 1 or greater and n−1 or less) is flat. In other words, in the small area $DW_m$, there is little difference between the maximum and minimum values of the count of number of pixels indicating a predetermined difference. The three-dimensional object detection unit 33 reduces the weighting of this type of small area $DW_m$. This is because the flat small area $DW_m$ lacks a characteristic and there is a high possibility that an error will be magnified when the offset amount is calculated.

On the other hand, a small area $DW_{m+k}$ (where k is an integer n−m or less) has abundant undulation. In other words, in the small area $DW_{m+k}$, there is considerable difference between the maximum and minimum values of the count of number of pixels indicating a predetermined difference. The three-dimensional object detection unit 33 increases the weighting of this type of small area $DW_{m+k}$. This is because the small area $DW_{m+k}$ abundant in undulation is characteristic and there is a high possibility that the offset amount will be accurately calculated. Weighting the small areas in this manner makes it possible to enhance the precision for calculating the movement distance.

The difference waveform $DW_t$ is divided into a plurality of small areas $DW_{t1}$ to $DW_{tn}$ in the present embodiment in order to enhance the precision for calculating the movement distance, but division into the small areas $DW_{t1}$ to $DW_{tn}$ is not required when the precision for calculating movement distance is not so needed. In this case, the three-dimensional object detection unit 33 calculates the movement distance from the offset amount of the difference waveform $DW_t$ when the error between the difference waveform $DW_t$ and the difference waveform $DW_{t-1}$ is at a minimum. In other words, the method for determining the offset amount between the difference waveform $DW_{t-1}$ at a single moment prior and the difference waveform $DW_t$ at the current moment is not limited to the details described above.

The three-dimensional object detection unit 33 in the present embodiment determines the movement speed of the host vehicle V1 (camera 10) and determines the offset amount for a stationary object from the determined movement speed. After the offset amount of the stationary object has been determined, the three-dimensional object detection unit 33 ignores the offset amount that corresponds to the stationary object within the maximum value of the histogram, and calculates the movement distance of the three-dimensional object.

Figure 14:
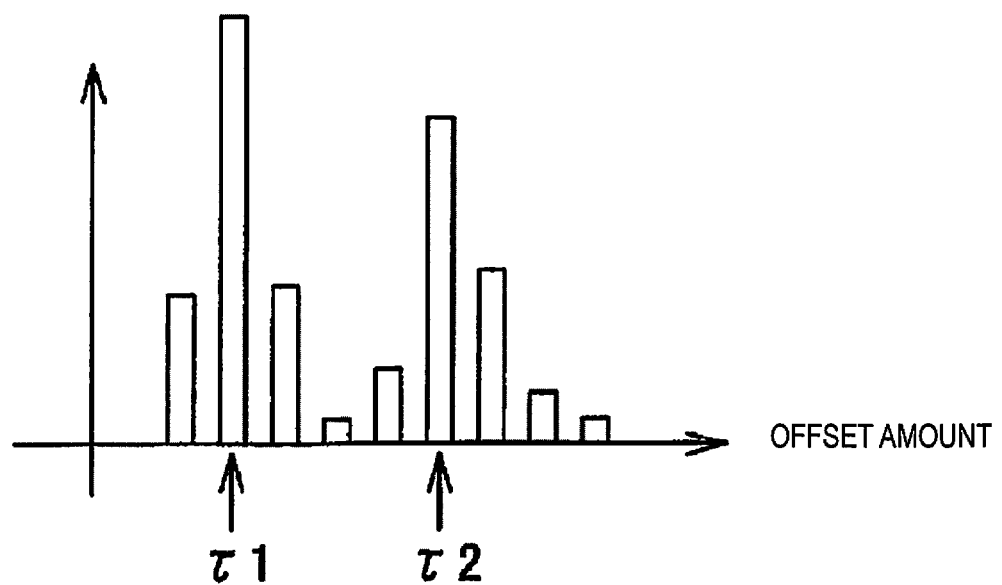
FIG. 14 is a view illustrating another example of the histogram obtained by the three-dimensional object detection unit.

FIG. 14 is a view illustrating another example of the histogram obtained by the three-dimensional object detection unit 33. When a stationary object other than the three-dimensional object is present within the view angle of the camera 10, two maximum values τ1, τ2 appear in the resulting histogram. In this case, one of the two maximum values τ1, τ2 is the offset amount of the stationary object. Consequently, the three-dimensional object detection unit 33 determines the offset amount for the stationary object from the movement speed, ignores the maximum value that corresponds to the offset amount, and calculates the movement distance of the three-dimensional object using the remaining maximum value. It is thereby possible to prevent a situation in which the precision for calculating the movement distance of the three-dimensional object is reduced by the stationary object.

Even when the offset amount corresponding to the stationary object is ignored, there may be a plurality of adjacent vehicles present within the view angle of the camera 10 when there is a plurality of maximum values. However, a plurality of three-dimensional objects present within the detection areas A1, A2 occurs very rarely. Accordingly, the three-dimensional object detection unit 33 stops calculating the movement distance. In the present embodiment, it is thereby possible to prevent a situation in which an errant movement distance is calculated such as when there is a plurality of maximum values.

Furthermore, the three-dimensional object detection unit 33 calculates the relative movement speed of the three-dimensional object in relation to the host vehicle by time-differentiating the calculated relative movement distance of the three-dimensional object, and also adds the speed of the host vehicle detected by the speed sensor 20 to the calculated relative movement speed of the three-dimensional object to calculate the absolute movement speed of the three-dimensional object.

Figure 15:
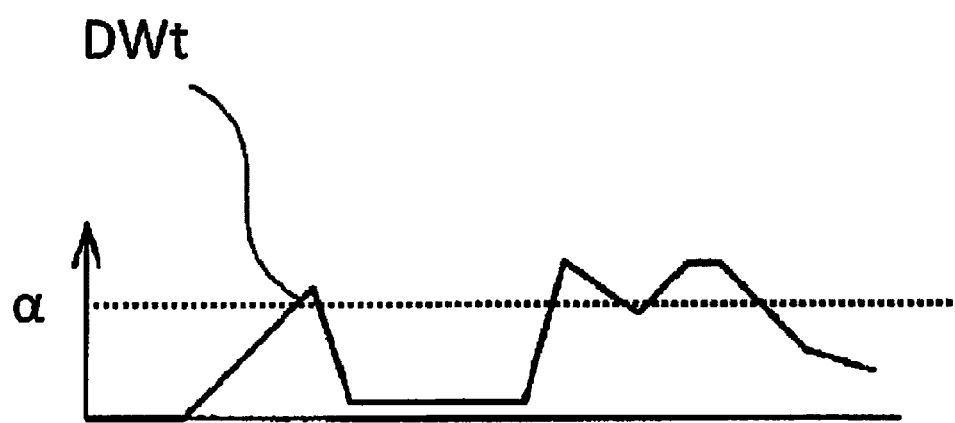
FIG. 15 is a view describing the method for assessing an adjacent vehicle present in an adjacent lane.

After the difference waveform $DW_t$ has been generated, the three-dimensional object detection unit 33 detects an adjacent vehicle present in an adjacent lane based on the generated difference waveform $DW_t$. Here, FIG. 15 is a view for describing the method for assessing another vehicle present in an adjacent lane, and illustrates an example of the difference waveform $DW_t$ and the threshold value α for detecting an adjacent vehicle present in an adjacent lane. The three-dimensional object detection unit 33 determines, as shown in FIG. 15, whether the peak of the generated difference waveform $DW_t$ is at a predetermined threshold value α or greater, assesses the detected three-dimensional object to be an adjacent vehicle present in the adjacent lane when the peak of the difference waveform $DW_t$ is at a predetermined threshold value α or greater, and assesses the three-dimensional object detected by the three-dimensional object detection unit 33 not to be an adjacent vehicle present in an adjacent lane when the peak of the difference waveform $DW_t$ is not at a predetermined threshold value α or greater.

Figure 16:
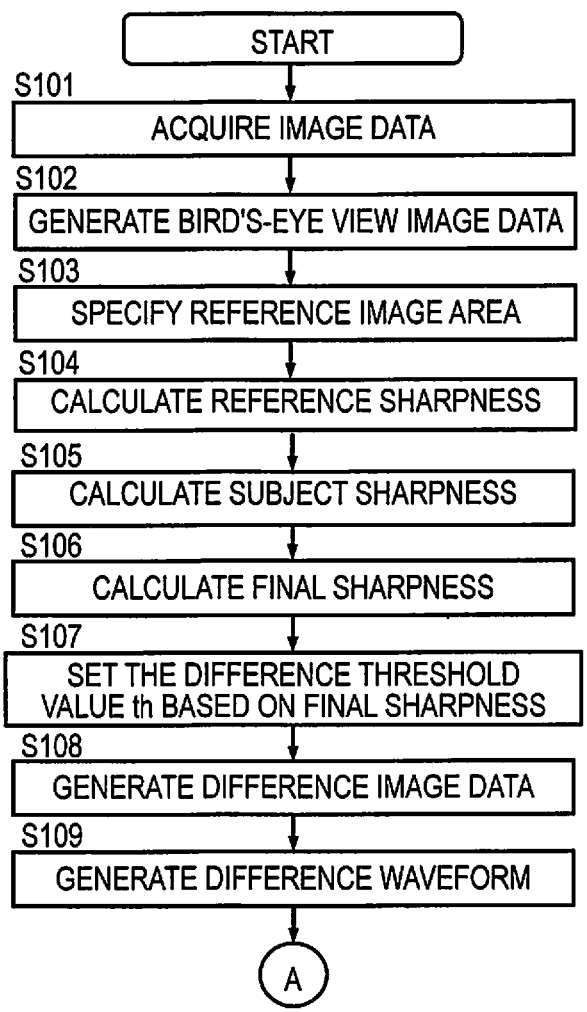
FIG. 16 is a first part of a flowchart illustrating the method for detecting an adjacent vehicle according to the first embodiment.
Figure 17:
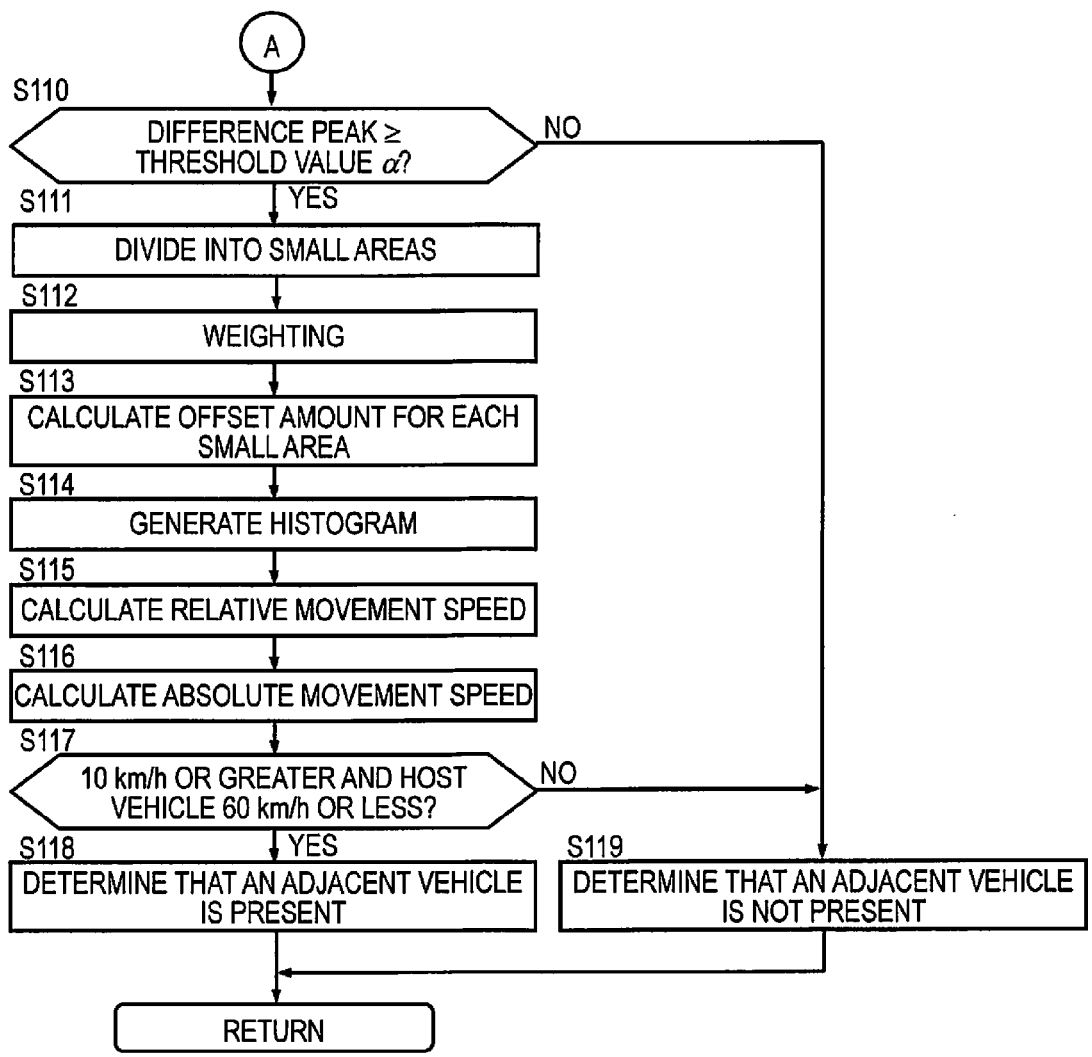
FIG. 17 is a second part of a flowchart illustrating the method for detecting an adjacent vehicle according to the first embodiment.

Described next is the process for detecting an adjacent vehicle in accordance with the present embodiment. FIGS. 16 and 17 are flowcharts illustrating a process for detecting an adjacent vehicle according to the present embodiment. First, data of a captured image is acquired by the computer 30 from the camera 10 (step S101), as illustrated in FIG. 16, and data of a bird's-eye view image $PB_t$ is generated (step S102) based on the data of the captured image thus acquired.

Next, the sharpness calculation unit 35 sets, as a reference image area, an area in which extraction of a fixed quantity edges or more is predicted in the bird's-eye view image $PB_t$ (step S103), and calculates the amount of clarity of the image in the reference image area as the reference sharpness (step S104). Also, the sharpness calculation unit 35 calculates the amount of clarity of the image in the detection areas A1, A2 as the subject sharpness (step S105).

The sharpness calculation unit 35 selects the higher value of the reference sharpness calculated in step S104 and the subject sharpness calculated in step S105 to thereby calculate the final sharpness, as illustrated in FIG. 8 (step S106). The difference threshold value setting unit 34 then sets the difference threshold value th (step S107) based on the final sharpness calculated in step S106, as illustrated in FIG. 9.

Next, the alignment unit 32 aligns the bird's-eye view image $PB_t$ data and the bird's-eye view image $P13_{t-1}$ data at a single moment prior, sets to a pixel value of "1" the pixels having a difference (the difference between pixel values in the bird's-eye view images $PB_t$, $PB_{t-1}$) equal to or greater than the difference threshold value th or greater set in step S107, and sets the pixels having a difference less than the difference threshold value th to a pixel value of "0" to thereby generate difference image $PD_t$ data (step S108). The three-dimensional object detection unit 33 thereafter counts the number of difference pixels DP having a pixel value of "1" to generate a difference waveform $DW_t$ from the difference image $PD_t$ data (step S109).

Advancing to FIG. 17, the three-dimensional object detection unit 33 then determines whether a peak in the difference waveform $DW_t$ is at a predetermined threshold value α or greater (step S110). When the peak of the difference waveform $DW_t$ is not at the threshold value α or greater, i.e., when there is essentially no difference, it is possible that a three-dimensional object is not present in the captured image. Accordingly, when it has been determined that the peak of the difference waveform $DW_t$ is not at the threshold value α or greater (step S110=No), the three-three-dimensional object detection unit 33 determines that another vehicle is not present in that a three-dimensional object is not present (step S119). The process then returns to step S101 illustrated in FIG. 16, and repeats the processing illustrated in FIGS. 16 and 17.

On the other hand, when the peak in the difference waveform $DW_t$ is determined to be at a threshold value α or greater (step S110=Yes), the three-dimensional object detection unit 33 determines that a three-dimensional object is present in the adjacent lane and proceeds to step S111 where the difference waveform $DW_t$ is divided into a plurality of small areas $DW_{t1}$ to $DW_{tn}$ by the three-dimensional object detection unit 33. The three-dimensional object detection unit 33 next imparts weighting to each of the small areas $DW_{t1}$ to $DW_{tn}$ (step S112), calculates the offset amount for each of the small areas $DW_{t1}$ to $DW_{tn}$ (step S113), and generates a histogram with consideration given to the weightings (step S114).

The three-dimensional object detection unit 33 calculates the relative movement distance, which is the movement distance of the adjacent vehicle in relation to the host vehicle, based on the histogram, and time-differentiates the calculated relative movement distance to thereby calculate the relative movement speed (step S115). The three-dimensional object detection unit 33 furthermore adds the host vehicle speed detected by the speed sensor 20 and calculates the absolute movement speed of the three-dimensional object in relation to the host vehicle (step S116).

The three-dimensional object detection unit 33 determines whether the absolute movement speed of the three-dimensional object is 10 km/h or more and whether the relative movement speed of the three-dimensional object in relation to the host vehicle is +60 km/h or less (step S117). When both conditions are satisfied (step S117=Yes), the three-dimensional object detection unit 33 determines that a three-dimensional object is present in the adjacent lane and that an adjacent vehicle is present in the adjacent lane (step S118). The process then returns to step S101 illustrated in FIG. 16, and repeats the processing illustrated in FIGS. 16 and 17. On the other hand, when either condition is not satisfied (step S117=No), the three-dimensional object detection unit 33 determines that an adjacent vehicle is not present in the adjacent lane (step S119). The process then returns step S101 illustrated in FIG. 16 and repeats the processing illustrated in FIGS. 16 and 17.

In the present embodiment, the detection areas A1, A2 are the rearward side directions of the host vehicle, and focus is placed on whether the host vehicle may possibly make contact with an adjacent vehicle should a lane change be made. Accordingly, the process of step S117 is implemented. In other words, assuming that the system in the present embodiment is actuated on an expressway, when the speed of an adjacent vehicle is less than 10 km/h, it would rarely be a problem even if an adjacent vehicle were to be present because the adjacent vehicle would be positioned far behind the host vehicle when a lane change is made. Similarly, when the relative movement speed of an adjacent vehicle exceeds +60 km/h in relation to the host vehicle (i.e., when the adjacent vehicle is moving at a speed 60 km/h greater than the speed of the host vehicle), it would rarely be a problem because the adjacent vehicle would be positioned ahead of the host vehicle when a lane change is made. Accordingly, it can be construed that an adjacent vehicle, which would be a problem should a lane change be made, is being determined in step S127.

In step S117, it is determined whether the absolute movement speed of the adjacent vehicle is 10 km/h or greater, and whether the relative movement speed of the adjacent vehicle in relation to the host vehicle is +60 km/h or less, thereby obtaining the following effect. For example, a possible case is that the absolute movement speed of a stationary object is detected to be several kilometers per hour depending on the attachment error of the camera 10. Accordingly, determining whether the speed is 10 km/h or greater makes it possible to reduce the possibility that the stationary object will be determined to be an adjacent vehicle. Also, it is possible that the relative speed of an adjacent vehicle in relation to the host vehicle will be detected to be in excess of +60 km/h due to noise. Accordingly, determining whether the relative speed is +60 km/h or less makes it possible to reduce the possibility of errant detection due to noise.

In lieu of the processing in step S117, it may be determined that the absolute movement speed of the adjacent vehicle is not a negative value, or is not 0 km/h. Also, in the present embodiment, since focus is placed on whether there is a possibility that contact will be made [with the adjacent vehicle] should the host vehicle make a lane change, a warning sound may be emitted to the driver of the host vehicle, or a display corresponding to a warning may be provided by a predetermined display device when an adjacent vehicle has been detected in step S118.

Thus, in the first embodiment, two images obtained at different moments are converted to bird's-eye view images, and a difference image $PD_t$ is generated based on the difference between the bird's-eye view images. The number of pixels that indicate a predetermined difference in the difference image $PD_t$ is counted and a frequency distribution is formed to thereby generate a difference waveform and detect an adjacent vehicle present in an adjacent lane based on the generated difference waveform. Also, in the present embodiment, when a difference image $PD_t$ is to be generated, an area in which extraction of a fixed quantity of edges or more is predicted is set as the reference image area, the amount of clarity of the image in the reference image area is calculated as the reference sharpness based on the edges detected in the reference image area, and the amount of clarity of the image in the detection areas is calculated as the subject sharpness based on the edges detected in the detection areas A1, A2. The reference sharpness and the subject sharpness are compared, the higher value of the reference sharpness and the subject sharpness is selected, and the final sharpness is calculated. The difference threshold value th is set higher in commensurate fashion to a higher final sharpness thus calculated, and the difference threshold value th is set lower in commensurate fashion to a lower final sharpness. Thus, in accordance with the present embodiment, the difference threshold value th to a low value when the lens of the camera 10 is soiled overall, the image lacks clarity, and the final sharpness is therefore calculated to be a low value. It is thereby possible to enhance sensitivity for detecting the difference between two bird's-eye view images at different moments. As a result, a difference that corresponds to a three-dimensional object can be suitably detected from between two bird's-eye view images at different moments, and the three-dimensional object can be accurately detected based on the detected difference, even when the lens of the camera 10 is soiled overall and the image lacks clarity.

In the present embodiment, the reference sharpness and the subject sharpness are compared when the final sharpness is to be calculated, and when the subject sharpness is lower than the reference sharpness, the reference sharpness is calculated as the final sharpness. The difference threshold value th is set to a suitable value based on the reference sharpness, even when the subject sharpness is calculated to be a low value because a three-dimensional object is not present in the detection areas and an edge of a three-dimensional object is not detected, and it is therefore possible to effectively prevent noise and the like from being errantly detected as a difference between bird's-eye view images. In other words, when the subject sharpness is calculated to be a low value because a three-dimensional object is not present in the detection areas and an edge of the three-dimensional object cannot be detected, there are cases in which the difference threshold value th would be excessively low were the difference threshold value th to be set based on the calculated subject sharpness, and noise and the like would be errantly detected as a difference between the bird's-eye view images even through a three-dimensional object is not present in the detection areas. In contrast, in the present embodiment, the difference threshold value th is set based on the reference sharpness when the subject sharpness is calculated to be a low value, and it is therefore possible to effectively prevent errant detection of a three-dimensional object caused by such noise or the like.

Figure 18:
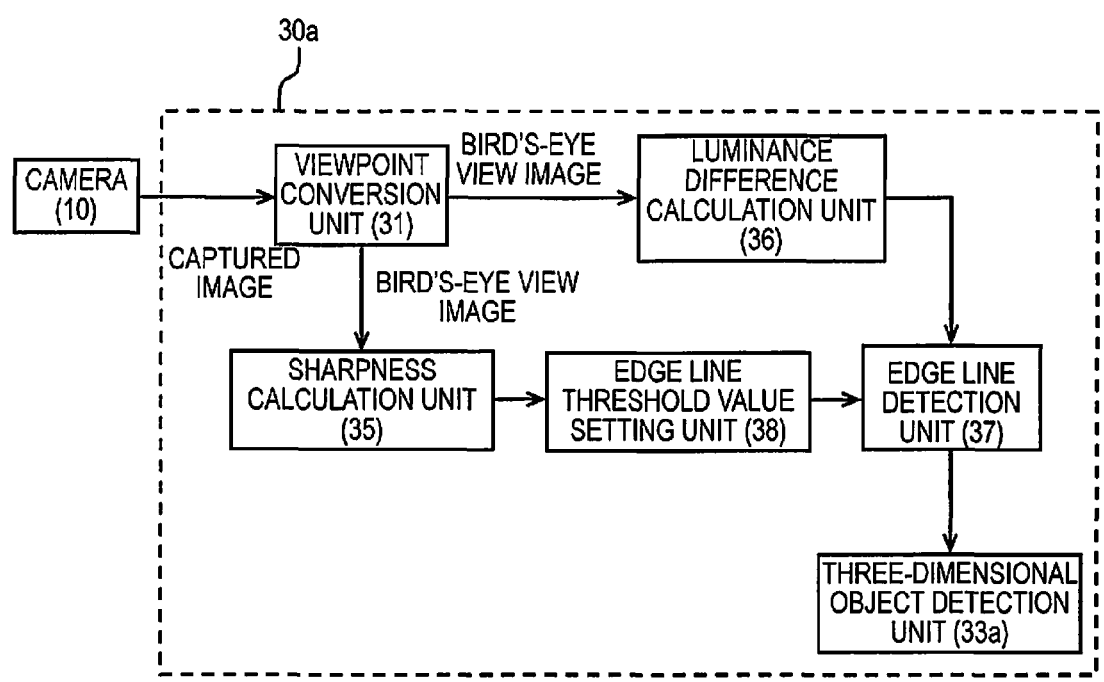
FIG. 18 is a block diagram illustrating the details of the computer according to a second embodiment.

Described next is a three-dimensional object detection device 1a according to the second embodiment. The three-dimensional object detection device 1a according to the second embodiment is the same as the first embodiment, except that a computer 30a is provided in lieu of the computer 30 of the first embodiment, as illustrated in FIG. 18, and the operation is as described below. Here, FIG. 18 is a block view illustrating the details of the computer 30a according to the second embodiment.

The three-dimensional object detection device 1a according to the second embodiment is provided with a camera 10 and a computer 30a, as illustrated in FIG. 18. The computer 30a is provided with a viewpoint conversion unit 31, a three-dimensional object detection unit 33a, a sharpness calculation unit 35, a luminance difference calculation unit 36, an edge line detection unit 37, and an edge-threshold-value setting unit 38. The configuration of the three-dimensional object detection device 1a according to the second embodiment is described below.

Figure 19:
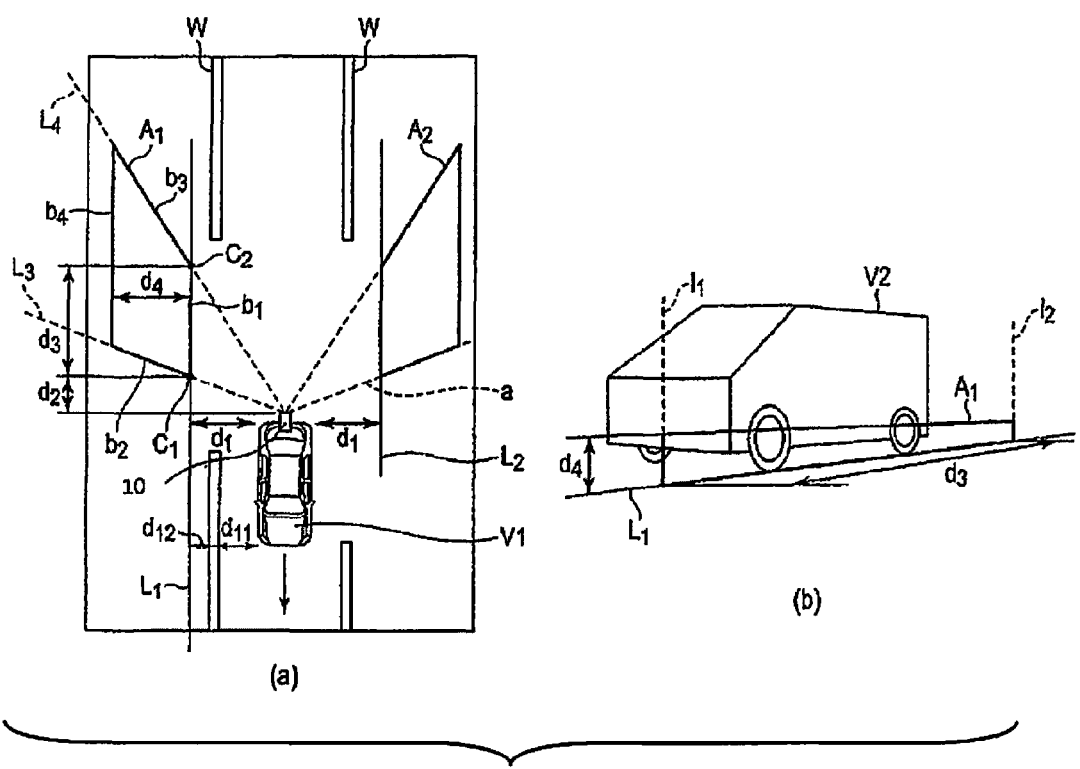
FIG. 19 is a view illustrating the travel state of the vehicle, with part (a) illustrating the positional relationship between the detection area and the like from a top plan view, and part (b) illustrating the positional relationship between the detection area and the like in real space in perspective.

FIG. 19 is a view illustrating the image range of the camera 10 in FIG. 18, part (a) of FIG. 19 is a plan view, and part (b) of FIG. 19 is a perspective view in real space rearward from the host vehicle V1. The camera 10 is set to a predetermined view angle a, and the rearward side of the host vehicle V1 included in the predetermined view angle a is captured, as illustrated in part (a) of FIG. 19. The view angle a of the camera 10 is set so that adjacent lanes are included in the capture range of the camera 10 in addition to the lane in which the host vehicle V1 is traveling, in the same manner as illustrated in FIG. 2.

The detection areas A1, A2 in the present example are trapezoidal in a plan view (bird's-eye view state), the position, size, and shape of the detection areas A1, A2 are decided based on distances $d_1$ to $d_4$. The detection areas A1, A2 of the example illustrated in the drawing are not limited to being trapezoidal, and may also be rectangular or another shape in a bird's-eye view state, as illustrated in FIG. 2.

Here, the distance d1 is the distance from the host vehicle V1 to the ground lines L1, L2. The ground lines L1, L2 refer to a line in which a three-dimensional object, which is present in a lane adjacent to the lane in which the host vehicle V1 is traveling, is in contact with the ground. In the present embodiment, an object is to detect an adjacent vehicle V2 or the like (including two-wheeled vehicles or the like) traveling in the left or right lane behind the host vehicle V1 and adjacent to the lane of the host vehicle V1. Accordingly, the distance d1, which is the position of the ground lines L1, L2 of the adjacent vehicle V2, can be decided so as to be substantially fixed from the distance d11 from the host vehicle V1 to a white line W and the distance d12 from the white line W to the position in which the adjacent vehicle V2 is predicted to travel.

The distance d1 is not limited to being fixedly decided, and may be variable. In this case, the computer 30a recognizes the position of the white line W in relation to the host vehicle V1 using white line recognition or another technique, and the distance d11 is decided based on the position of the recognized white line W. The distance d1 is thereby variably set using the decided distance d11. In the present embodiment described below, the position in which the adjacent vehicle V2 is travelling (the distance d12 from the white line W) and the position in which the host vehicle V1 is travelling (the distance d11 from the white line W) is mostly predictable, and the distance d1 is fixedly decided.

A distance d2 is the distance extending from the rear end part of the host vehicle V1 in the vehicle progress direction. The distance d2 is decided so that the detection areas A1, A2 are accommodated within at least the view angle a of the camera 10. In the present embodiment in particular, the distance d2 is set so as to be in contact with a range partitioned within the view angle a. The distance d3 indicates the length of the detection areas A1, A2 in the vehicle progression direction. The distance d3 is decided based on the size of the three-dimensional object to be detected. In the present embodiment, the object to be detected is an adjacent vehicle V2 or the like, and therefore the distance d3 is set to a length that includes the adjacent vehicle V2.

The distance d4 indicates the height, which has been set so that the tires of the adjacent vehicle V2 or the like are included in real space, as illustrated in part (b) of FIG. 19. In a bird's-eye view image, the distance d4 is the length illustrated in part (a) of FIG. 19. The distance d4 may also be a length that does not include lanes further adjacent to the left and right adjacent lanes in the bird's-eye view image (i.e., adjacent-adjacent lanes two lanes away). This is because when the lanes two lanes away from the lane of the host vehicle V1 are included, it is no longer possible to distinguish whether an adjacent vehicle V2 is present in the adjacent lanes to the left and right of the lane in which the host vehicle V1 is traveling, or whether an adjacent-adjacent vehicle is present in an adjacent-adjacent lane two lanes away.

As described above, the distances d1 to d4 are decided, and the position, size, and shape of the detection areas A1, A2 are thereby decided. More specifically, the position of the top side b1 of the detection areas A1, A2 that form a trapezoid is decided by the distance d1. The starting position C1 of the top side b1 is decided by the distance d2. The end position C2 of the top side b1 is decided by the distance d3. The lateral side b2 of the detection areas A1, A2 that form a trapezoid is decided by a straight line L3 extending from the camera 10 toward the starting position C1. Similarly, the lateral side b3 of the detection areas A1, A2 that form a trapezoid is decided by a straight line L4 extending from the camera 10 toward the end position C2. The position of the lower side b4 of the detection areas A1, A2 that form a trapezoid is decided by the distance d4. In this manner, the areas surrounded by the sides b1 to b4 are the detection areas A1, A2. The detection areas A1, A2 are regular squares (rectangles) in real space rearward from the host vehicle V1, as illustrated in part (b) of FIG. 19.

Returning to FIG. 18, the viewpoint conversion unit 31 accepts input of captured image data of a predetermined area captured by the camera 10. The viewpoint conversion unit 31 converts the viewpoint of the inputted captured image data into bird's-eye view image data, which is a bird's-eye view state. A bird's-eye view state is a state of viewing from the viewpoint of an imaginary camera that is looking down from above, e.g., vertically downward (or slightly inclined downward). Viewpoint conversion can be carried out using the technique described in, e.g., Japanese Laid-Open Patent Application No. 2008-219063.

The luminance difference calculation unit 36 calculates luminance differences in the bird's-eye view image data, which has undergone viewpoint conversion by the viewpoint conversion unit 31, in order to detect the edges of a three-dimensional object included in the bird's-eye view image. The luminance difference calculation unit 36 calculates, for each of a plurality of positions along a perpendicular imaginary line extending along the perpendicular direction in real space, the luminance difference between two pixels near each position. The luminance difference calculation unit 36 is capable of calculating the luminance difference by a method for setting a single perpendicular imaginary line extending in the perpendicular direction in real space, or a method for setting two perpendicular imaginary lines.

Described below is the specific method for setting two perpendicular imaginary lines. The luminance difference calculation unit 36 sets a first perpendicular imaginary line that corresponds to a line segment extending in the perpendicular direction in real space in the bird's-eye view image converted in viewpoint, and a second perpendicular imaginary line that is different from the first perpendicular imaginary line and that corresponds to the line segment extending in the perpendicular direction in real space. The luminance difference calculation unit 36 determines the luminance difference between a point on the first perpendicular imaginary line and a point on the second perpendicular imaginary line in continuous fashion along the first perpendicular imaginary line and the second perpendicular imaginary line. The operation of the luminance difference calculation unit 36 is described in detail below.

Figure 20:
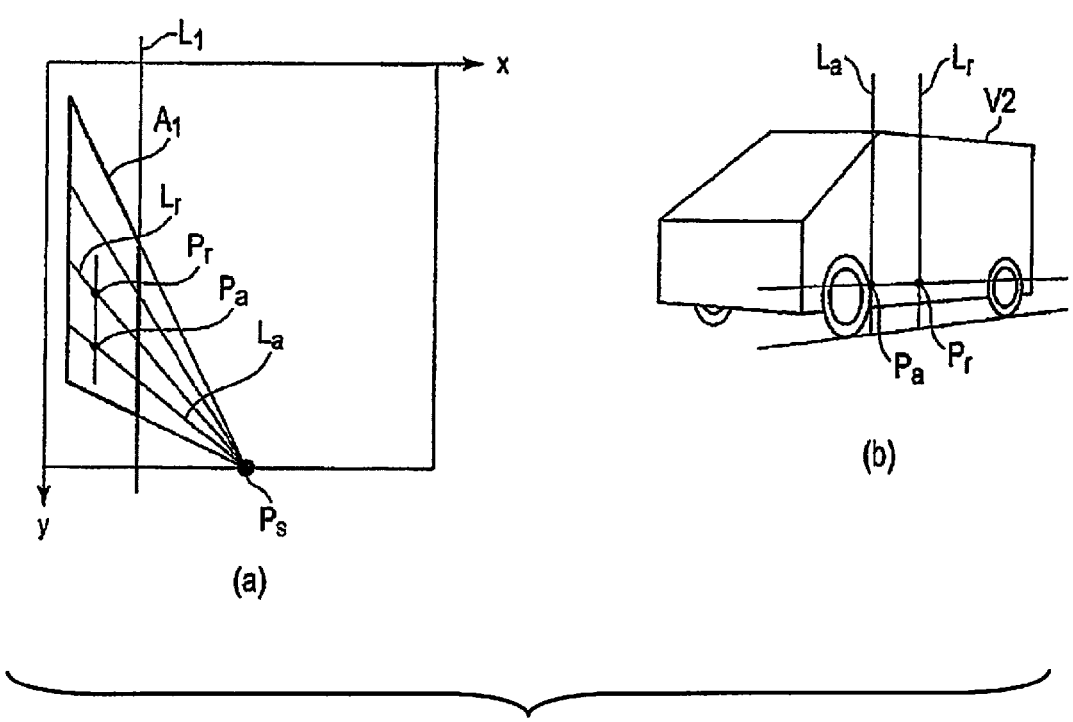
FIG. 20 is a view for describing the operation of the luminance difference calculation unit according to the second embodiment, with part (a) illustrating the positional relationship between the attention line, reference line, attention point, and reference point in a bird's-eye view image, and part (b) illustrating the positional relationship between the attention line, reference line, attention point, and reference point real space.

The luminance difference calculation unit 36 sets a first perpendicular imaginary line La (hereinbelow referred to as attention line La) that corresponds to a line segment extending in the perpendicular direction in real space and that passes through the detection area A1, as illustrated in part (a) of FIG. 20. The luminance difference calculation unit 36 sets a second perpendicular imaginary line Lr (hereinbelow referred to as reference line Lr) that is different from the attention line La, corresponds to the line segment extending in the perpendicular direction in real space, and passes through the detection area A1. Here, the reference line Lr is set to a position at a distance from the attention line La by a predetermined distance in real space. The lines that correspond to the line segments extending in the perpendicular direction in real space are lines that spread out in the radial direction from the position Ps of the camera 10 in a bird's-eye view image. These lines spreading out in the radial direction are lines that follow the collapsing direction of the three-dimensional object when converted to a bird's-eye view.

The luminance difference calculation unit 34 sets an attention point Pa on the attention line La (a point on the first perpendicular imaginary line). The luminance difference calculation unit 36 sets a reference point Pr on the reference line Lr (a point on the second perpendicular imaginary line). The attention line La, the attention point Pa, the reference line Lr, and the reference point Pr have the relationship in real space illustrated part (b) of in FIG. 20. It is apparent from part (b) of FIG. 20 that the attention line La and the reference line Lr are lines extending in the perpendicular direction in real space, and that the attention point Pa and the reference point Pr are points set to substantially the same height in real space. The attention point Pa and the reference point Pr are not necessarily required to be rigorously kept at the same height, and a certain amount of error that allows for the attention point Pa and the reference point Pr to be deemed to be at the same height is allowed.

The luminance difference calculation unit 36 determines the luminance difference between the attention point Pa and the reference point Pr. If the luminance difference between the attention point Pa and the reference point Pr is great, it is possible that an edge is present between the attention point Pa and the reference point Pr. In the second embodiment in particular, a perpendicular imaginary line is set as a line segment extending in the perpendicular direction in real space in relation to the bird's-eye view image, in order to detect a three-dimensional object present in the detection areas A1, A2. Therefore, there is a high possibility that there is an edge of a three-dimensional object in the location where the attention line La has been set when the luminance difference between the attention line La and the reference line Lr is high. Accordingly, the edge line detection unit 37 illustrated in FIG. 18 detects an edge line based on the luminance difference between the attention point Pa and the reference point Pr.

Figure 21:
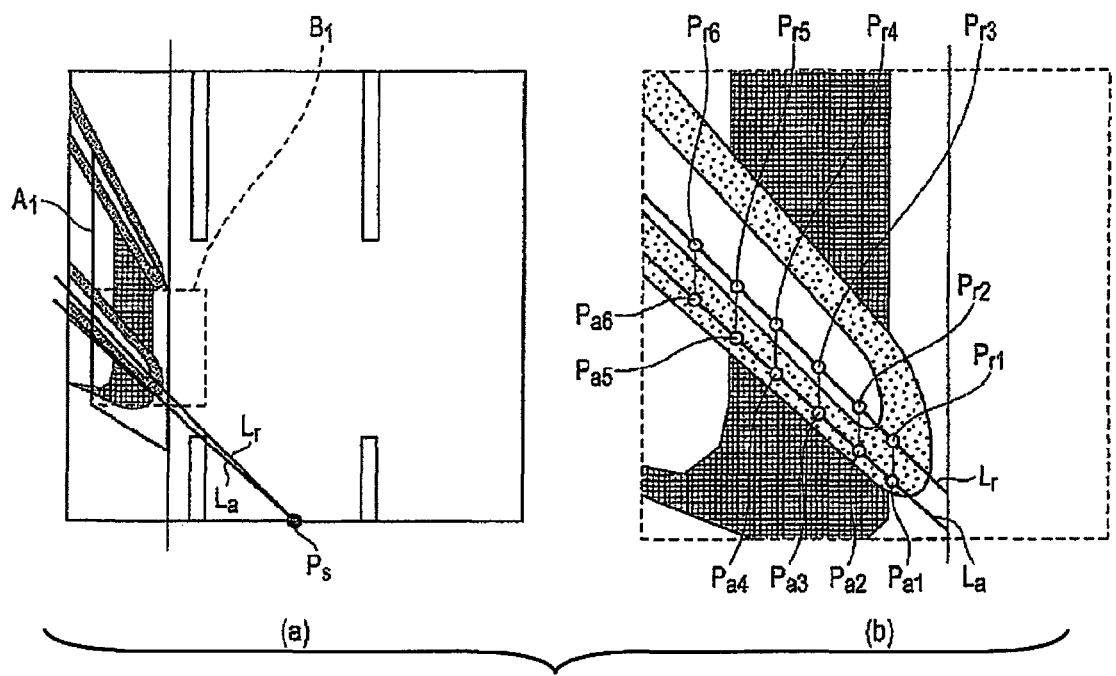
FIG. 21 is a view for describing the detailed operation of the luminance difference calculation unit according to the second embodiment, with part (a) illustrating the detection area in the bird's-eye view image, and part (b) illustrating the positional relationship between the attention line, reference line, attention point, and reference point in the bird's-eye view image.

This point will be described in greater detail. FIG. 21 is a view for describing the detailed operation of the luminance difference calculation unit 36. Part (a) of FIG. 21 illustrates a bird's-eye view image of the bird's-eye view state, and part (b) of FIG. 21 is an enlarged view of a portion B1 of the bird's-eye view image illustrated in part (a) of FIG. 21. In FIG. 21, only the detection area A1 is illustrated and described, but the luminance difference is calculated using the same procedure for detection area A2.

When the adjacent vehicle V2 is being displayed in the captured image captured by the camera 10, the adjacent vehicle V2 appears in the detection area A1 in the bird's-eye view image, as illustrated in part (a) of FIG. 21. The attention line La is set on a rubber portion of a tire of the adjacent vehicle V2 in the bird's-eye view image in part (b) of FIG. 21, as illustrated in the enlarged view of area B1 in part (a) of FIG. 21. In this state, first, the luminance difference calculation unit 36 sets the reference line Lr. The reference line Lr is set along the perpendicular direction in a position set at a predetermined distance in real space from the attention line La. Specifically, in the three-dimensional object detection device 1a according to the present embodiment, the reference line Lr is set in a position at a distance of 10 cm away in real space from the attention line La. The reference line Lr is thereby set on the wheel of the tire of the adjacent vehicle V2 set, e.g., at a distance that corresponds to 10 cm from the rubber of the tire of the adjacent vehicle V2 in the bird's-eye view image.

Next, the luminance difference calculation unit 36 sets a plurality of attention points Pa1 to PaN on the attention line La. In part (b) of FIG. 21, six attention points Pa1 to Pa6 (hereinbelow referred to as attention point Pai when indicating an arbitrary point) are set for convenience of description. An arbitrary number of attention points Pa may be set on the attention line La. In the description below, N attention points Pa are set on the attention line La.

The luminance difference calculation unit 36 subsequently sets the reference points Pr1 to PrN so as to have the same height as the attention points Pa1 to PaN in real space. The luminance difference calculation unit 36 calculates the luminance difference between attention point Pa and reference point Pr pairs at the same height. The luminance difference calculation unit 36 thereby calculates the luminance difference between two pixels for each of the plurality of positions (1-N) along the perpendicular imaginary line extending in the perpendicular direction in real space. The luminance difference calculation unit 36 calculates the luminance difference between, e.g., a first attention point Pa1 and a first reference point Pr1, and calculates the luminance difference between a second attention point Pa2 and a second reference point Pr2. The luminance difference calculation unit 36 thereby determines the luminance difference in continuous fashion along the attention line La and the reference line Lr. In other words, the luminance difference calculation unit 36 sequentially determines the luminance difference between the third to $N^{th}$ attention points Pa3 to PaN and the third to $N^{th}$ reference points Pr3 to PrN.

The luminance difference calculation unit 36 repeats the process of setting the above-described reference line Lr, setting the attention point Pa, setting the reference point Pr, and calculating the luminance difference while shifting the attention line La within the detection area A1. In other words, the luminance difference calculation unit 36 repeatedly executes the above-described process while changing the positions of the attention line La and the reference line Lr by the same distance in real space along the direction in which the ground line L1 extends. The luminance difference calculation unit 36, e.g., sets the line that was the reference line Lr in the previous process to be the attention line La, sets the reference line Lr in relation to the attention line La, and sequentially determines the luminance difference.

In this manner, in the second embodiment, determining the luminance difference from the attention point Pa on the attention line La and the reference point Pr on the reference line Lr, which are at substantially the same height in real space, allows the luminance difference to be distinctly detected when an edge extending in the perpendicular direction is present. The precision for detecting a three-dimensional object can be enhanced without the process for detecting the three-dimensional object being affected, even when the three-dimensional object is enlarged in accordance with the height from the road surface by conversion to a bird's-eye view image in order compare the luminance between the perpendicular imaginary lines extending in the perpendicular direction in real space.

Returning to FIG. 18, the edge line detection unit 37 detects the edge line from the continuous luminance difference calculated by the luminance difference calculation unit 36. For example, in the case illustrated in part (b) of FIG. 21, the first attention point Pa1 and the first reference point Pr1 are positioned at the same tire portion, and the luminance difference is therefore small. On the other hand, the second to sixth attention points Pa2 to Pa6 are positioned at the rubber portions of the tire, and the second to sixth reference points Pr2 to Pr6 are positioned at the wheel portion of the tire. Therefore, the luminance difference between the second to sixth attention points Pa2 to Pa6 and the second to sixth reference points Pr2 to Pr6 is great. Accordingly, the edge line detection unit 37 is capable of detecting that an edge is present between the second to sixth attention points Pa2 to Pa6 and the second to sixth reference points Pr2 to Pr6 where the luminance difference is high.

Specifically, when an edge line is to be detected, the edge line detection unit 37 first assigns an attribute to the $i^{th}$ attention point Pai from the luminance difference between the $i^{th}$ attention point Pai (coordinates (xi, yi)) and the $i^{th}$ reference point Pri (coordinates (xi', yi')) in accordance with formula 1 noted below.

$s(xi,yi)=1$ when $I(xi, yi) > I(xi', yi') + t$ $s(xi,yi)=-1$ when $I(xi, yi) < I(xi', yi') - t$ $s(xi,yi)=0$      Formula 1 when the above do not hold true.

In formula 1 above, t represents the edge threshold value, I(xi, yi) represents the luminance value of the $i^{th}$ attention point Pai, and I(xi', yi') represents the luminance value of the $i^{th}$ reference point Pri. In accordance with formula 1, the attribute s(xi, yi) of the attention point Pai is '1' when the luminance value of the attention point Pai is greater than the luminance value obtained by adding the edge threshold value t to the reference point Pri. On the other hand, the attribute s(xi, yi) of the attention point Pai is '−1' when the luminance value of the attention point Pai is less than the luminance value obtained by subtracting the edge threshold value t from the reference point Pri. The attribute s(xi, yi) of the attention point Pai is '0' when the luminance value of the attention point Pai and the luminance value of the reference point Pri are in a relationship other than that stated above. The edge threshold value t is set by the later-described edge-threshold-value setting unit 38.

Next, the edge line detection unit 37 assesses whether the attention line La is an edge line from the continuity c(xi, yi) of the attribute s along the attention line La based on the following formula 2.

$c(xi,yi)=1$ when s(xi, yi)=s(xi+1, yi+1) (excluding when 0=0)

$c(xi,yi)=0$      Formula 2 when the above does not hold true.

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 37 determines the sum of the continuities c of all the attention points Pa on the attention line La. The edge line detection unit 37 divides the sum of the continuities c thus determined by the number N of attention points Pa to thereby normalize the continuity c. The edge line detection unit 37 determines the attention line La to be an edge line when the normalized value has exceeded a threshold value θ. The threshold value θ is set in advance by experimentation or other means.

In other words, the edge line detection unit 37 determines whether the attention line La is an edge line based on formula 3 noted below. The edge line detection unit 37 then determines whether all of the attention lines La drawn on the detection area A1 are edge lines.

$\Sigma c(xi,yi)/N > \theta$      Formula 3

Figure 22:
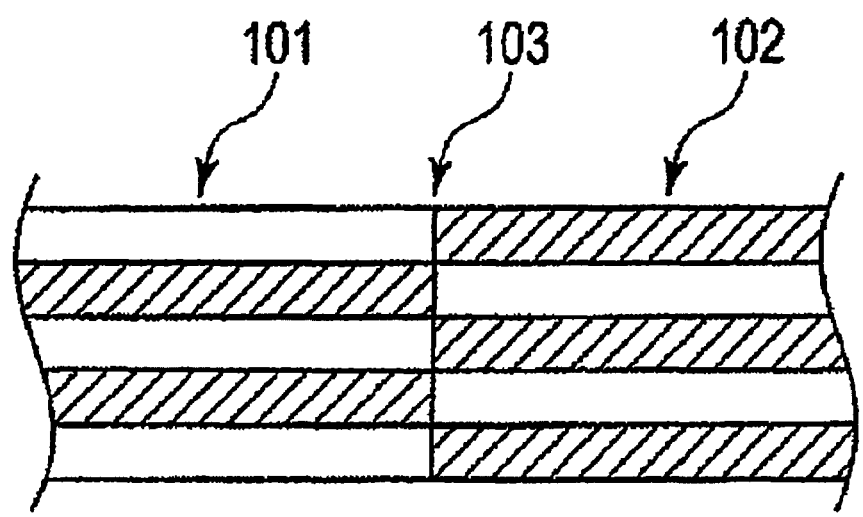
FIG. 22 is a view illustrating an image example for describing edge detection operation.

In this manner, in the second embodiment, an attribute is assigned to the attention point Pa based on the luminance difference between the attention point Pa on the attention line La and the reference point Pr on the reference line Lr, and it is determined whether the attention line La is an edge line based on the continuity c of the attributes along the attention line La. Therefore, the boundaries between areas having high luminance and areas having low luminance are detected as edge lines, and edges can be detected in accordance with the natural senses of a human. The results of the above will be described. FIG. 22 is a view illustrating an image example for describing the processing of the edge line detection unit 37. This image example is an image in which a first stripe pattern 101 and a second stripe pattern 102 are adjacent to each other, the first stripe pattern 101 indicating a stripe pattern in which areas of high luminance and areas of low luminance are repeated, and the second stripe pattern 102 indicating a stripe pattern in which areas of low luminance and areas of high luminance are repeated. Also, in this image example, areas of the first stripe pattern 101 in which the luminance is high, and areas of the second stripe pattern 102 in which the luminance is low are adjacent to each other, and areas of the first stripe pattern 101 in which the luminance is low, and areas of the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the areas of low luminance and the areas of high luminance are adjacent to each other, the location 103 is recognized as an edge when an edge is detected only by luminance difference. However, the edge line detection unit 37 assesses the location 103 to be an edge line only when there is continuity in the attributes of the luminance difference. Therefore, the edge line detection unit 37 is capable of suppressing errant assessment in which the location 103, which is not recognized as an edge line by human senses, is recognized as an edge line, and edges can be detected in accordance with human senses.

Returning to FIG. 18, the three-dimensional object detection unit 33a detects a three-dimensional object based on the quantity of edge lines detected by the edge line detection unit 37. As described above, the three-dimensional object detection device 1a according to the present embodiment detects an edge line extending in the perpendicular direction in real space. Detecting many edge lines extending in the perpendicular direction indicates that there is a high possibility that a three-dimensional object is present in the detection areas A1, A2. Accordingly, the three-dimensional object detection unit 33a detects a three-dimensional object based on the quantity of edge lines detected by the edge line detection unit 37. Specifically, the three-dimensional object detection unit 33a determines whether the quantity of edge lines detected by the edge line detection unit 37 is a predetermined threshold value β or greater, and when the quantity of edge lines is a predetermined threshold value β or greater, the edge lines detected by the edge line detection unit 37 are determined to be the edge lines of a three-dimensional object.

Furthermore, prior to detecting the three-dimensional object, the three-dimensional object detection unit 33a assesses whether the edge lines detected by the edge line detection unit 37 are correct. The three-dimensional object detection unit 33a assesses whether a change in luminance on the edge lines is a predetermined threshold value tb or greater along the edge lines of the bird's-eye view image. When the change in luminance on the edge lines in the bird's-eye view image is a predetermined threshold value tb or greater, the edge lines are determined to have been detected by errant assessment. On the other hand, when the change in luminance on the edge lines in the bird's-eye view image is less than a predetermined threshold value tb, it is assessed that the edge lines are correct. The threshold value tb is set in advance by experimentation or other means.

Figure 23:
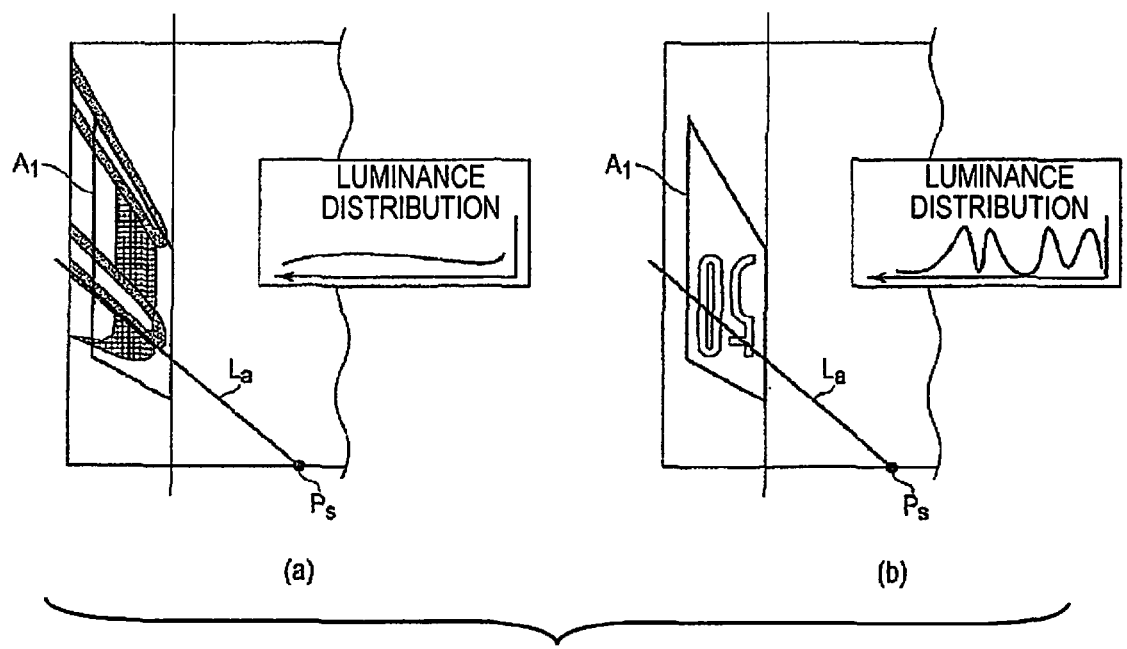
FIG. 23 is a view illustrating the edge line and the luminance distribution on the edge line, with part (a) illustrating the luminance distribution when a three-dimensional object (adjacent vehicle) is present in the detection area, and part (b) illustrating the luminance distribution when a three-dimensional object is not present in the detection area.

FIG. 23 is a view illustrating the luminance distribution on the edge line, with part (a) of FIG. 23 illustrating the edge line and the luminance distribution when an adjacent vehicle V2 as a three-dimensional object is present in the detection area A1, and part (b) of FIG. 23 illustrating the edge line and the luminance distribution when a three-dimensional object is not present in the detection area A1.

As illustrated in part (a) of FIG. 23, it is assumed that it has been determined that the attention line La set on the tire rubber portion of the adjacent vehicle V2 in on an edge line in the bird's-eye view image. In this case, the change in luminance on the attention line La in the bird's-eye view image is gradual. This is due to the image captured by the camera 10 being converted in viewpoint to a bird's-eye view image, whereby the tire of the adjacent vehicle is enlarged within the bird's-eye view image. On the other hand, the attention line La set in the white character portion "50" drawn on the road surface in the bird's-eye view image is assumed to have been errantly assessed to be an edge line, as illustrated in part (b) of FIG. 23. In this case, the change in luminance on the attention line La in the bird's-eye view image has considerable undulations. This is because the road and other portions of low luminance are mixed with the portions of high luminance in the white characters on the edge line.

The three-dimensional object detection unit 33a assesses whether an edge line has been detected by errant assessment based on differences in the luminance distribution on the attention line La as described above. When the change in luminance along an edge line is at a predetermined threshold value tb or greater, the three-dimensional object detection unit 33a determines that the edge line has been detected by errant assessment and that the edge line is not caused by a three-dimensional object. A reduction in precision for detecting a three-dimensional object is thereby suppressed when white characters such as "50" on the road surface, roadside vegetation, and the like are assessed to be edge lines. On the other hand, the three-dimensional object detection unit 33a determines that an edge line is the edge line of a three-dimensional object and determines that a three-dimensional object is present when changes in luminance along the edge line are less than a predetermined threshold value tb.

Specifically, the three-dimensional object detection unit 33a calculates the change in luminance of the edge line using formula 4 or 5 noted below. The change in luminance of the edge line corresponds to the evaluation value in real space in the perpendicular direction. Formula 4 evaluates the luminance distribution using the total value of the square of the difference between the $i^{th}$ luminance value I(xi, yi) and the adjacent $i^{th}+1$ luminance value I(xi+1, yi+1) on the attention line La. Formula 5 evaluates the luminance distribution using the total value of the absolute value of the difference between the $i^{th}$ luminance value I(xi, yi) and the adjacent $i^{th}+1$ luminance value I(xi+1, yi+1) on the attention line La.

Evaluation value in perpendicular equivalent
direction=$\Sigma[\{I(xi,yi)-I(xi+1,yi+1)\}^2]$        Formula 4

Evaluation value in perpendicular equivalent
direction=$\Sigma|I(xi,yi)-I(xi+1,yi+1)|$        Formula 5

No limitation is imposed in the use of formula 5, and it is also possible to binarize an attribute b of an adjacent luminance value using a threshold value t2, and then sum the binarized attribute b for all of the attention points Pa, as in formula 6 noted below.

Evaluation value in perpendicular equivalent
direction=$\Sigma b(xi,yi)$        Formula 6 where b(xi, yi)=1 when |I(xi, yi)−I(xi+1, yi+1)|>t2
and b(xi, yi)=0
when the above does not hold true.

The attribute b(xi, yi) of the attention point Pa(xi, yi) is '1' when the absolute value of the luminance difference between the luminance value of the attention point Pai and the luminance value of the reference point Pri is greater than a threshold value t2. When the above relationship does not hold true, the attribute b(xi, yi) of the attention point Pai is '0.' The threshold value t2 is set in advance by experimentation or other means so that the attention line La is not assessed to be on the same three-dimensional object. The three-dimensional object detection unit 33a then sums the attribute b for all of the attention points Pa on the attention line La and determines the evaluation value in the perpendicular equivalent direction to thereby assess whether an edge line is caused by a three-dimensional object and that a three-dimensional object is present.

Figure 24:
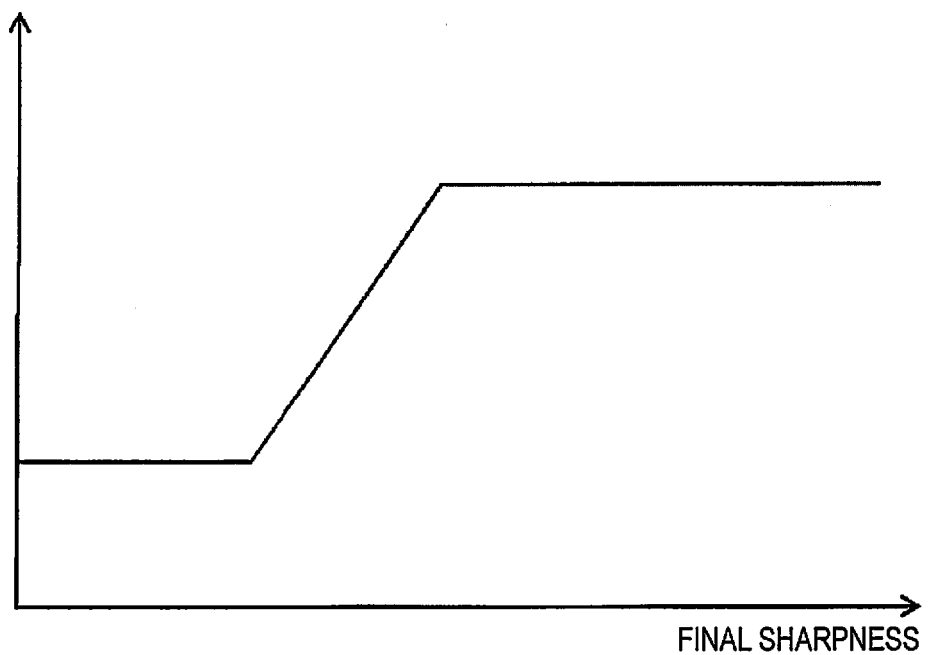
FIG. 24 is a graph for illustrating an example of the relationship between the final sharpness and the edge threshold value t.

Returning to FIG. 18, the edge-threshold-value setting unit 38 sets the edge threshold value t to be used in detecting edge lines, based on the final sharpness calculated by the sharpness calculation unit 35. Specifically, the edge-threshold-value setting unit 38 sets the edge threshold value t higher in commensurate fashion to a higher final sharpness, as illustrated in FIG. 24, and sets the edge threshold value t lower in commensurate fashion of a lower final sharpness. The method for calculating the final sharpness carried out by the sharpness calculation unit 35 is the same as in the first embodiment, and a description thereof is therefore omitted.

Figure 25:
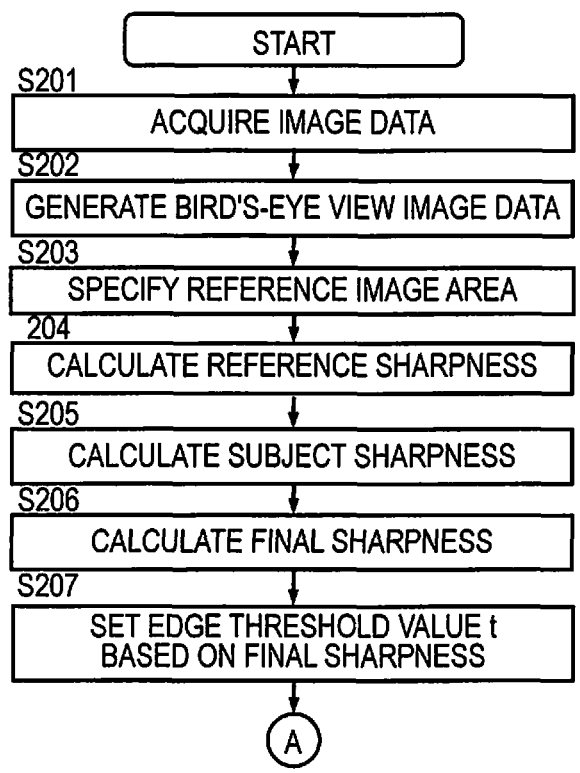
FIG. 25 is a flowchart illustrating the method for detecting an adjacent vehicle according to the second embodiment.
Figure 26:
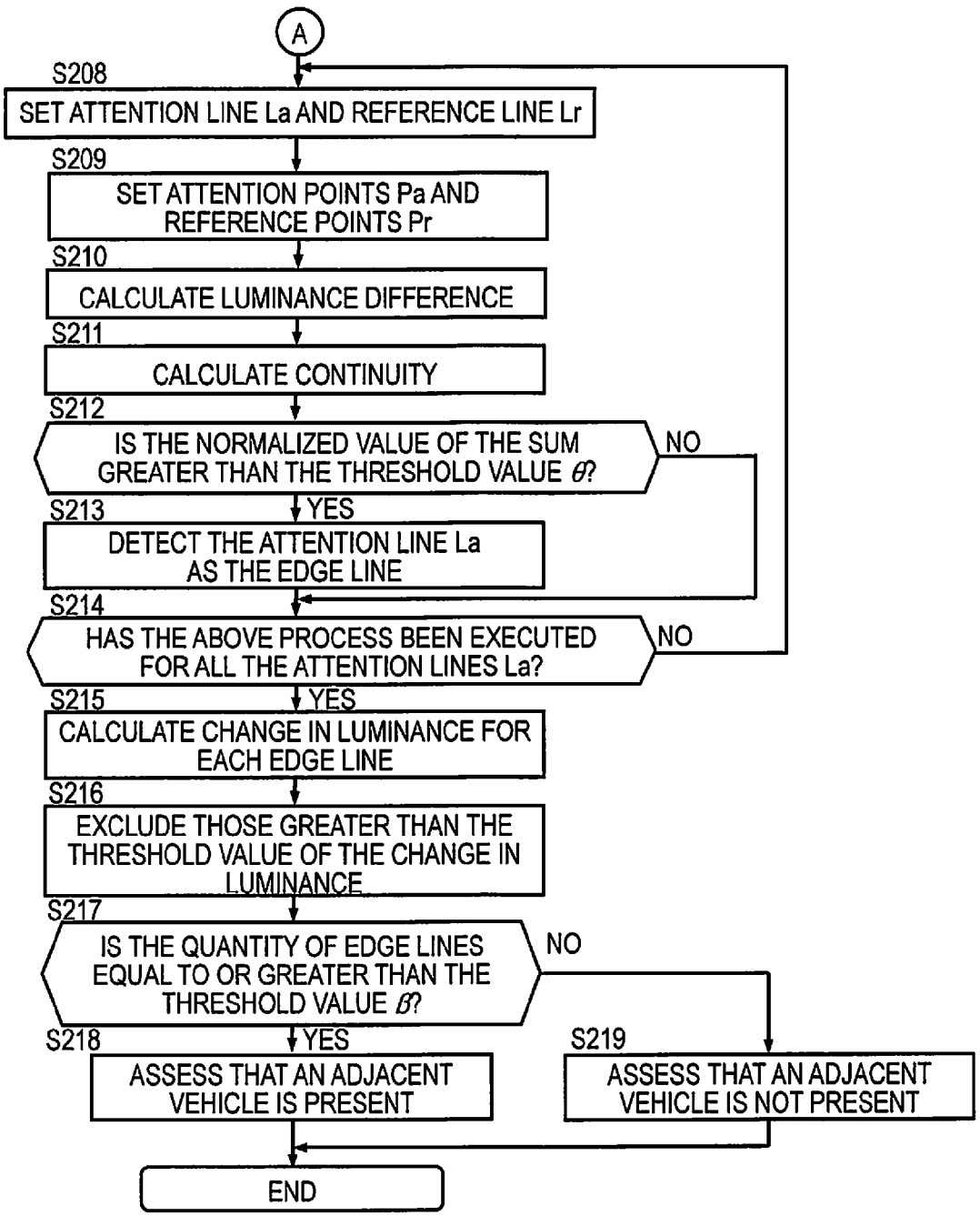
FIG. 26 is a flowchart illustrating the method for detecting an adjacent vehicle according to the second embodiment.

Next, the method for detecting an adjacent vehicle according to the second embodiment will be described. FIGS. 25 and 26 are flowcharts illustrating the details of the method for detecting an adjacent vehicle according to the second embodiment. In FIGS. 25 and 26, the process involved with detection area A1 will be described for the sake of convenience, but the same process is executed for the detection area A2 as well.

First, in step S201, image data of the captured image captured by the camera 10 is acquired by the computer 30a. Next, the viewpoint conversion unit 31 converts the viewpoint of the acquired image data and generates bird's-eye view image data in step S202.

Next, the sharpness calculation unit 35 sets, as the reference image area, an area of the bird's-eye view image $PB_t$ in which extraction of a predetermined quantity of edges or greater is predicted (step S203), and calculates the amount of clarity of the image in the reference image area as the reference sharpness (step S204). Also, the sharpness calculation unit 35 calculates the amount of clarity of the image in the detection areas A1, A2 as the subject sharpness (step S205).

The sharpness calculation unit 35 selects the higher value of the reference sharpness calculated in step S204 and the subject sharpness calculated in step S205 to thereby calculate the final sharpness (step S206). The difference threshold value setting unit 34 then sets the edge threshold value t (step S207) based on the final sharpness calculated in step S206, as illustrated in FIG. 24.

Advancing to FIG. 26, the luminance difference calculation unit 36 sets the attention line La and the reference line Lr on the detection area A1 in step S208. At this point, the luminance difference calculation unit 36 sets a line corresponding to a line extending in the perpendicular direction in real space as the attention line La, and sets a line that corresponds to a line segment extending in the perpendicular direction in real space and a line separated from the attention line La by a predetermined distance in real space as the reference line Lr.

Next, in step S209, the luminance difference calculation unit 36 sets a plurality of attention points Pa on the attention line La, and sets a reference point Pr so that the attention points Pa and the reference point Pr are at substantially the same height in real space. The attention points Pa and the reference point Pr thereby line up in substantially the horizontal direction, and the edge line extending in the perpendicular direction in real space is more readily detected. The luminance difference calculation unit 36 sets a certain number of attention points Pa that will not be problematic during edge detection by the edge line detection unit 37.

Next, in step S210, the luminance difference calculation unit 36 calculates the luminance difference between the attention points Pa and the reference points Pr at the same height in real space. The edge line detection unit 37 calculates the attribute s of the attention points Pa in accordance with formula 1 described above based on the edge threshold value t set in step S207.

In step S211, the edge line detection unit 37 then calculates the continuity c of the attribute s of the attention points Pa in accordance with formula 2. In step S212, the edge line detection unit 37 furthermore assesses whether a value obtained by normalizing the sum of the continuity c is greater than a threshold value in accordance with formula 3. When it has been determined that the normalized value is greater than the threshold value θ (step S212=Yes), the edge line detection unit 37 detects the attention line La as the edge line in step S213. The process then proceeds to step S214. When it has been determined that the normalized value is not greater than the threshold value θ (step S212=No), the edge line detection unit 37 does not detect that the attention line La is an edge line, and the process proceeds to step S214.

In step S214, the computer 30a determines whether the processes of steps S208 to S214 have been executed for all the attention lines La that can be set on the detection area A1. When it has been determined that the above processes have not been carried out for all the attention lines La (step S214=No), the process returns to step S208, sets a new attention line La, and repeats the process through step S214. On the other hand, when it has been determined that the processes have been carried out for all the attention lines La (step S214=Yes), the process proceeds to step S215.

In step S215, the three-dimensional object detection unit 33a calculates the change in luminance along the edge line for each edge line detected in step S213. The three-dimensional object detection unit 33a calculates the change in luminance of edge lines in accordance with any of formulas 4, 5, and 6. Next, in step S216, the three-dimensional object detection unit 33a excludes, from among the edge lines, edge lines in which the change in luminance is at a predetermined threshold value tb or greater. In other words, when an edge line having a large change in luminance is not assessed to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value tb is determined by experimentation or other means in advance, and is set based on the change in luminance that occurs due to characters on the road surface, roadside vegetation, and the like. On the other hand, the three-dimensional object detection unit 33a determines, among the edge lines, an edge line having a change in luminance that is less than a predetermined threshold value tb to be an edge line of a three-dimensional object, and thereby detects the three-dimensional object present in an adjacent vehicle.

Next, in step S217, it is determined by the three-dimensional object detection unit 33a whether the quantity of edge lines is a predetermined threshold value β or higher. When it has been assessed that the quantity of edge lines is at the threshold value β or greater (step S217=Yes), the three-dimensional object detection unit 33a determines that an adjacent vehicle is present in the detection area A1 in step S218. On the other hand, when it is has been assessed that the quantity of edge lines is not at a threshold value β or higher (step S218=No), the three-dimensional object detection unit 33a assesses in step S219 that an adjacent vehicle is not present in the detection area A1. The processing illustrated in FIGS. 25 and 26 then ends.

In this manner, in the second embodiment, a captured image is converted to a bird's-eye view image, and edge information of the three-dimensional object is detected from the converted bird's-eye view image to thereby detect an adjacent vehicle present in an adjacent lane. Also, in the second embodiment, when a difference image $PD_t$ is to be generated, an image area in which extraction of a fixed quantity of edges or more is predicted is set as the reference image area, the amount of clarity of the image in the reference image area is calculated as the reference sharpness based on the edges detected in the reference image area, the amount of clarity of the image in the detection areas is calculated as the subject sharpness based on the edges detected in the detection areas A1, A2, and the higher value of the reference sharpness and the subject sharpness is selected as the final sharpness, in similar fashion to the first embodiment. The difference threshold value th is set higher in commensurate fashion to a calculated higher final sharpness, and the difference threshold value th is set lower in commensurate fashion to a lower final sharpness. In addition to the effects of the first embodiment, it is thereby possible to enhance sensitivity for detecting the difference between two bird's-eye view images at different moments when final sharpness is calculated to be a low value because the lens of the camera 10 is soiled overall and the image lacks clarity, even when a three-dimensional object is detected based on edge information. As a result, a difference that corresponds to a three-dimensional object can be suitably detected from between two bird's-eye view images at different moments, and the three-dimensional object can be accurately detected based on the detected difference.

The embodiments described above are described in order to facilitate understanding of the present invention, and are not described in order to limit the present invention. Therefore, the elements disclosed in the embodiments above are intended to include all design modifications and equivalents thereto that lie within the technical range of the present invention.

Figure 27:
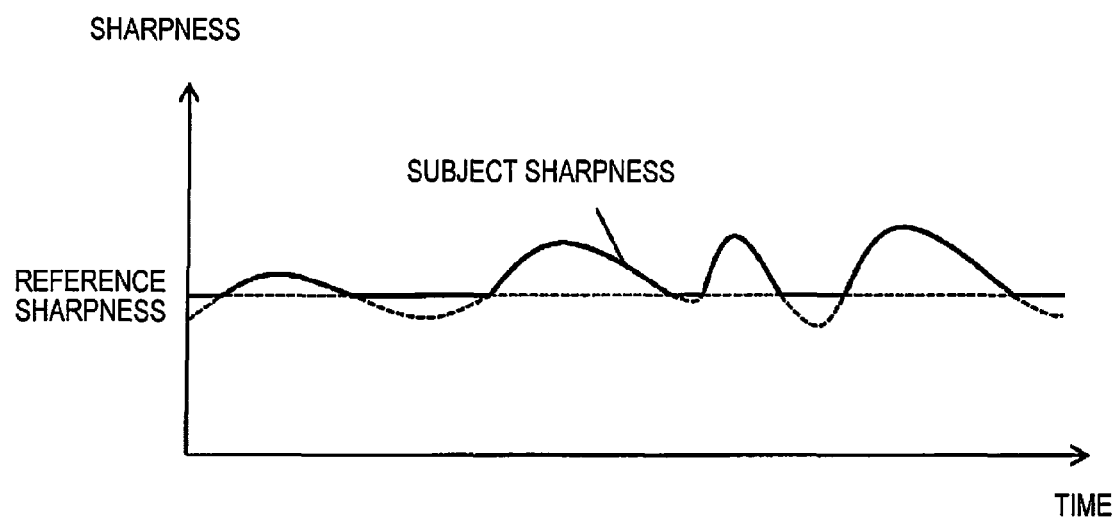
FIG. 27 is a view for describing another method for comparing the reference sharpness and the subject sharpness, and calculating the final sharpness.
Figure 28:
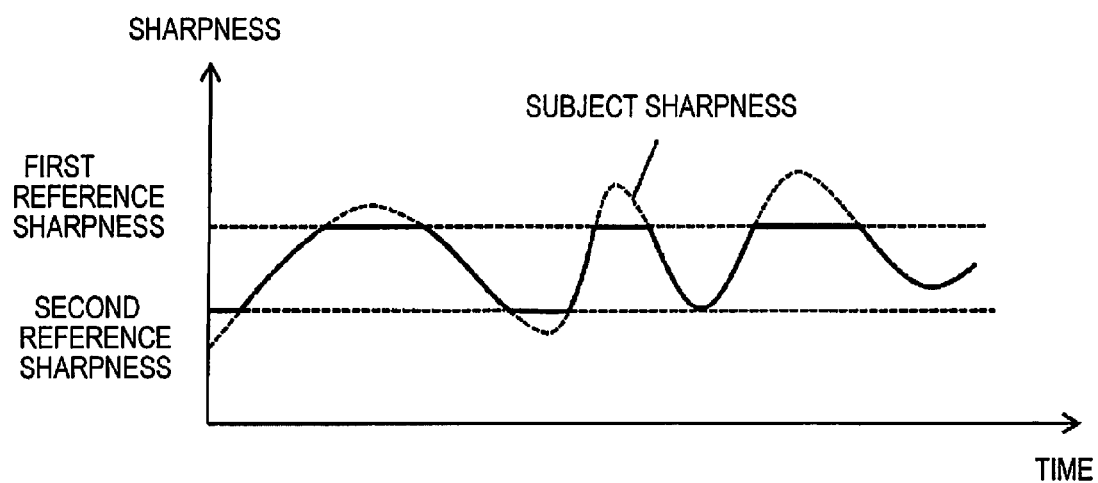
FIG. 28 is a view for describing another method for comparing the reference sharpness and the subject sharpness, and calculating the final sharpness.

For example, in the embodiments described above, a configuration was given as an example in which the reference sharpness and the subject sharpness are calculated, and the higher of the calculated reference sharpness and the subject sharpness is selected to thereby calculated the final sharpness, as illustrated in FIG. 8. However, no limitation is imposed thereby, and it is also possible to use a configuration in which, e.g., the subject sharpness is calculated, the reference sharpness is set at a fixed value, and the higher of the calculated subject sharpness and the reference sharpness set in advance is selected to thereby calculate the final sharpness, as shown in FIG. 27. Alternatively, as illustrated in FIG. 28, it is also possible to use a configuration in which the subject sharpness is calculated, and a first reference sharpness and a second reference sharpness which is lower than the first reference sharpness are set to fixed values, the first reference sharpness is selected as the final sharpness when the subject sharpness is higher than the first reference sharpness, the second reference sharpness is selected as the final sharpness when the subject sharpness is lower than the second reference sharpness, and the subject sharpness is selected as the final sharpness when the subject sharpness is equal to or less than the first reference sharpness and is equal to or greater than the second reference sharpness. The final sharpness is expresses as a solid line in FIGS. 27 and 28 in the same manner as in FIG. 8.

A configuration was given as an example in the embodiments described above in which the difference threshold value th or the edge threshold value t is modified in accordance with the final sharpness, but no limitation is imposed thereby, and it is also possible to use a configuration in which the threshold value α or the threshold value β used for assessing an adjacent vehicle is modified in accordance with the final sharpness. Also, it is also possible to use a configuration in which the threshold value θ, the threshold value b, and the threshold value t2 for detecting edge lines are modified in accordance with the final sharpness.

Furthermore, a configuration was given as an example in the embodiments described above in which an image area having a difference in brightness with the surroundings that is a predetermined value or greater and a size having a predetermined surface area or greater is detected as an area corresponding to the light source when an image area containing an image of street lights, headlights of another vehicle, or another light source is to be set as the reference image area, but in this case, it is also possible use a configuration in which the extent of lens clouding (a thin white film formed on the lens surface) is calculated as the extent of clouding, and the light source is made more readily detected in commensurate fashion to a greater amount of lens clouding. Specifically, reducing threshold value of the luminance for detecting a light source or reducing the surface area in commensurate fashion to a greater extent of lens clouding makes the light source more readily detectable.

The method for calculating the extent of lens clouding is not particularly limited, and it is possible to, e.g., calculate the extent of lens clouding in the following manner. In other words, when water scale or other foreign matter is deposited on the lens and the lens is clouded, there are cases in which a portion of luminous flux from the subject may be blocked by the foreign matter deposited on the lens or be irregularly reflected, and an image of the subject cannot be suitably captured. Accordingly, when the lens is clouded, the brightness of the captured image, i.e., the sharpness of the image tends to be reduced. In view of this situation, it is possible to determine that the lens is more clouded in commensurate fashion to a lower image sharpness, and to make the light source more readily detectable. In the particular case that the lens is clouded, the light from a captured light source is weakened by foreign matter deposited on the lens, and there may be cases in which the luminance in the periphery of the light source at a distance from the center of the light source is reduced more greatly than the luminance detected as the light source. Accordingly, when the lens is clouded, the size of the captured light source is reduced in comparison with when the lens is not clouded, and there may be cases in which the difference in luminance with the surroundings is reduced. In view of the above, when the extent of lens clouding is considerable, it is possible to use a configuration in which a light source is detected and an image area containing the light source is set as the reference image area, even when the size of the high-luminance area is small or the difference in luminance with the surroundings is low.

The camera 10 in the embodiments described above corresponds to the image capturing means of the present invention. The three-dimensional object detection unit 33, 33a corresponds to the detection-area-setting means of the present invention. The viewpoint conversion unit 31 corresponds to the image conversion means of the present invention, and the alignment unit 32, the three-dimensional object detection unit 33, 33a, the difference threshold value setting unit 34, the luminance difference calculation unit 36, the edge line detection unit 37, and the edge threshold value setting unit 38 correspond to the three-dimensional object detection means of the present invention, and the sharpness calculation unit 35 corresponds to the light source detection means, reference image area setting means, the contour information extraction means, the reference sharpness calculation means, and the subject sharpness calculation means of the present invention.

The invention claimed is:

1. A three-dimensional object detection device comprising:
   a camera arranged to capture images rearward of a host vehicle equipped with the three-dimensional object detection device; and
   a computer;
   the computer being programmed to set a detection area for detecting a three-dimensional object rearward of the host vehicle;
   the computer being programmed to convert a viewpoint of the images obtained by the camera to create bird's-eye view images;
   the computer being programmed to detect a presence of a three-dimensional object within the detection area in which the bird's-eye view images obtained at different times are aligned, and difference waveform information is generated by counting and creating a frequency distribution of a number of pixels that indicate a predetermined difference having a difference threshold value or greater in a difference image of the bird's-eye view images that were aligned to detect the presence of the three-dimensional object within the detection area;
   the computer being programmed to set, as a reference image area, an image area that is different from the detection area and in which extraction of contour information of a subject is predicted;
   the computer being programmed to extract contour information of a subject in the reference image area and the detection area;
   the computer being programmed to calculate an amount of brightness of an image in the reference image area as a reference sharpness, based on the contour information extracted in the reference image area; and
   the computer being programmed to calculate an amount of brightness of an image in the detection area as a subject sharpness, based on the contour information extracted in the detection area,
   the computer calculating a final sharpness based on the reference sharpness and the subject sharpness, and setting the difference threshold value based on the final sharpness that was calculated.

2. The three-dimensional object detection device according to claim 1, wherein
   the computer sets an area corresponding to one of an image of a bumper of the host vehicle, a casing for attaching the camera to the host vehicle, and a license plate of the host vehicle as the reference image area.

3. The three-dimensional object detection device according to claim 1, wherein
   the computer sets an area corresponding to an image a containing a ground horizon or a water horizon as the reference image area.

4. The three-dimensional object detection device according to claim 1, further comprising:
   the computer being programmed to detect a light source present rearward of the host vehicle based on the images obtained by the camera,
   the computer setting an area containing an image of the detected light source as the reference image area.

5. The three-dimensional object detection device according to claim 4, wherein
   the computer detects the image area containing the light source from the images obtained by the camera as having a size of a predetermined surface area or greater and a difference in luminance relative to surrounding areas at a predetermined luminance difference or greater.

6. The three-dimensional object detection device according to claim 4, further comprising:
   the computer being programmed to calculate an extent of lens clouding of a lens of the camera based on the final sharpness; and
   the computer being programmed to improve detection of the light source by reducing at least one of the predetermined luminance difference and the predetermined surface area as the extent of lens clouding becomes higher.

7. The three-dimensional object detection device according to claim 1, wherein
   the computer extracts edge information of the subject as the contour information of the subject,
   the computer calculates the reference sharpness based on an edge intensity of the edge information extracted in the reference image area, and
   the computer calculates the subject sharpness based on an edge intensity of the edge information extracted in the detection area.

8. The three-dimensional object detection device according to claim 1, wherein
   the computer extracts a specific frequency component obtained from an image based on the images obtained by the camera as the contour information of the subject,
   the computer calculates the reference sharpness based on the frequency component extracted in the reference image area, and
   the computer calculates the subject sharpness based on the frequency component extracted in the detection area.

9. The three-dimensional object detection device according to claim 4, wherein
   the computer detects an area having a luminance of a predetermined value or greater as a high-luminance area, and extracts a luminance slope in a vicinity of the high-luminance area as the contour information of the subject,
   the computer calculates the reference sharpness based on the luminance slope in the vicinity of the high-luminance area extracted in the reference image area, and
   the computer calculates the subject sharpness based on the luminance slope at the periphery of the high-luminance area extracted in the detection area.

10. The three-dimensional object detection device according to claim 1, wherein
    the computer calculates as the final sharpness a higher value of the reference sharpness and the subject sharpness as a result of a comparison of the reference sharpness and the subject sharpness, and sets the difference threshold value to be higher in commensurate fashion to the higher final sharpness.

11. A three-dimensional object detection device comprising:

a camera arranged to capture an image of the rearward of a host vehicle equipped with the three-dimensional object detection device; and a computer;

the computer being programmed to set a detection area for detecting a three-dimensional object rearward of the host vehicle;

the computer being programmed to convert a viewpoint of the image obtained by the camera to create a bird's-eye view image;

the computer being programmed to detect a presence of a three-dimensional object within the predetermined detection area by vehicle width direction detection processing based on edge information having a predetermined edge threshold value or greater in contour information obtained from a contour of a subject in the bird's-eye view image;

the computer being programmed to set, as a reference image area, an image area that is different from the detection area and in which extraction of contour information of a subject is predicted;

the computer being programmed to extract contour information of a subject in the reference image area and the detection area;

the computer being programmed to calculate an amount of brightness of an image in the reference image area as a reference sharpness, based on the contour information extracted in the reference image area; and the computer being programmed to calculate an amount of brightness of an image in the detection area as a subject sharpness, based on the contour information extracted in the detection area, the computer calculating a final sharpness based on the reference sharpness and the subject sharpness, and setting the edge threshold value based on the final sharpness that was calculated.

12. The three-dimensional object detection device according to claim 11, wherein the computer calculates as the final sharpness the higher value of the reference sharpness and the subject sharpness as a result of a comparison of the reference sharpness and the subject sharpness, and sets the edge threshold value to be higher as the final sharpness becomes higher.

13. The three-dimensional object detection device according to claim 11, wherein the computer sets an area corresponding to one of an image of a bumper of the host vehicle, a casing for attaching the camera to the host vehicle, and a license plate of the host vehicle as the reference image area.

14. The three-dimensional object detection device according to claim 11, wherein the computer sets an area corresponding to an image a containing a ground horizon or a water horizon as the reference image area.

15. The three-dimensional object detection device according to claim 11, further comprising:

the computer being programmed to detect a light source present rearward of the host vehicle based on the image obtained by the camera, the computer setting an area containing an image of the detected light source as the reference image area.

16. The three-dimensional object detection device according to claim 15, wherein the computer detects the image area containing the light source from the image obtained by the camera as having a size of a predetermined surface area or greater and a difference in luminance relative to surrounding areas at a predetermined luminance difference or greater.

17. The three-dimensional object detection device according to claim 15, further comprising:

the computer being programmed to calculate an extent of lens clouding of a lens of the camera based on the final sharpness; and the computer being programmed to improve detection of the light source by reducing at least one of the predetermined luminance difference and the predetermined surface area as the extent of lens clouding becomes higher.

18. The three-dimensional object detection device according to claim 11, wherein the computer extracts edge information of the subject as the contour information of the subject, the computer calculates the reference sharpness based on an edge intensity of the edge information extracted in the reference image area, and the computer calculates the subject sharpness based on an edge intensity of the edge information extracted in the detection area.

19. The three-dimensional object detection device according to claim 11, wherein the computer extracts a specific frequency component obtained from an image based on the image obtained by the camera as the contour information of the subject, the computer calculates the reference sharpness based on the frequency component extracted in the reference image area, and the computer calculates the subject sharpness based on the frequency component extracted in the detection area.

20. The three-dimensional object detection device according to claim 15, wherein the computer detects an area having a luminance of a predetermined value or greater as a high-luminance area, and extracts a luminance slope in a vicinity of the high-luminance area as the contour information of the subject, the computer calculates the reference sharpness based on the luminance slope in the vicinity of the high-luminance area extracted in the reference image area, and the computer calculates the subject sharpness based on the luminance slope at the periphery of the high-luminance area extracted in the detection area.

* * * * *